United States Patent [19]

Yamamoto

[11] Patent Number: 5,615,332

[45] Date of Patent: Mar. 25, 1997

[54] DEBUGGING AID APPARATUS

[75] Inventor: Osamu Yamamoto, Itami, Japan

[73] Assignee: Mitsubishi Denki Kabushiki Kaisha, Tokyo, Japan

[21] Appl. No.: 359,387

[22] Filed: Dec. 20, 1994

[30] Foreign Application Priority Data

Dec. 21, 1993 [JP] Japan .................................. 5-322584

[51] Int. Cl.$^6$ .................................................... C06F 11/04
[52] U.S. Cl. ................................ 395/183.14; 395/183.21; 395/183.22
[58] Field of Search ................................ 395/575, 275, 395/183.01, 183.13, 183.14, 183.22, 183.21; 371/19

[56] References Cited

U.S. PATENT DOCUMENTS

| | | | |
|---|---|---|---|
| 4,866,665 | 9/1989 | Haswell-Smith | 364/900 |
| 4,879,646 | 11/1989 | Iwasaki et al. | 364/200 |
| 5,124,989 | 6/1992 | Padawer et al. | 371/19 |
| 5,134,701 | 7/1992 | Muller et al. | 395/500 |
| 5,265,254 | 11/1993 | Blasciak et al. | 395/700 |

FOREIGN PATENT DOCUMENTS 2-271436  11/1990  Japan .

OTHER PUBLICATIONS

Sun Release 4.1, dbx(1), Sun Microsystems, Dec. 1989.
Turbo Debugger User's Guide, version 2.5, Borland International, 1991, passim.

*Primary Examiner*—Robert W. Beausoliel, Jr.
*Assistant Examiner*—Norman M. Wright
*Attorney, Agent, or Firm*—Lowe, Price, LeBlanc & Becker

[57] ABSTRACT

A debugging aid apparatus that provides fetching system call data which includes a return address to the application task, but not, a return address to a high-level language interface routine, as the return address on completion of the system call instruction, when the system call is issued to an OS through the high-level language interface routine from an application task written in a high-level language.

5 Claims, 27 Drawing Sheets

FIG. 6
PRIOR ART

```
MOV FUNCTION CODE,R0 ; SET FUNCTION CODE INTO
                                REGISTER R0
MOV PARAMETER1,  R1 ; SET PARAMETER1 INTO
                                REGISTER R1
MOV PARAMETER2,  R2 ; SET PARAMETER2 INTO
                                REGISTER R2
   .      .              .
   .      .              .
   .      .              .
TRAP                 ; SOFTWARE INTERRUPT
                         (ISSUE SYSTEM CALL)
```

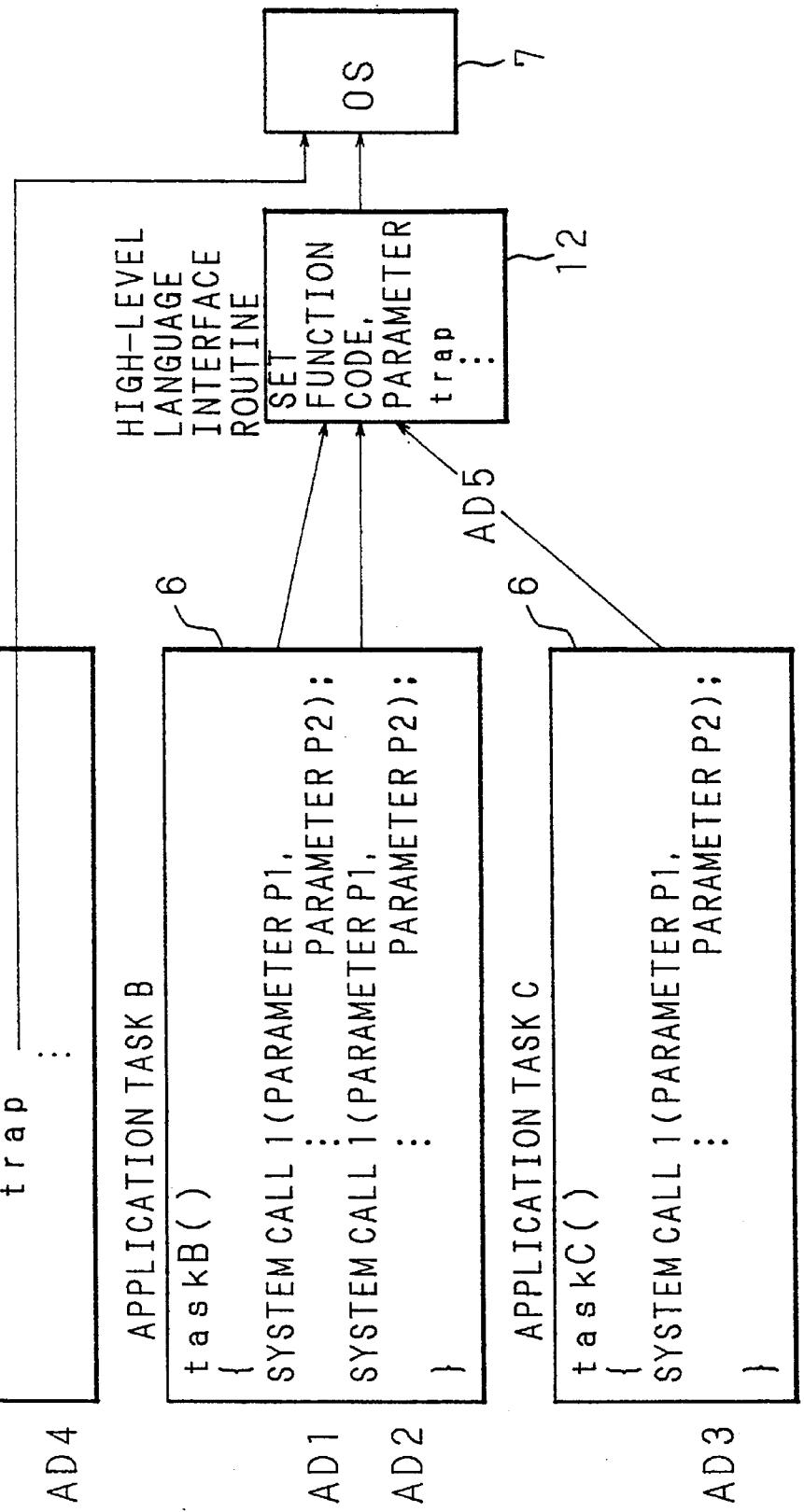

FIG. 12

```
SYSTEM CALL1:
    ... mov  #1,FLG      ;SET FLAG INDICATING ISSUE FROM HIGH-LEVEL
                          LANGUAGE INTERFACE ROUTINE
    ... mov  R2,@-SP     ;SAVE CONTENT OF REGISTER R2 TO STACK
    ... mov  R1,@-SP     ;SAVE CONTENT OF REGISTER R1 TO STACK
    ... mov  FUNCTION CODE OF SYSTEM CALL 1,R0;
                         SET FUNCTION CODE OF SYSTEM CALL 1 INTO REGISTER R0
    ... mov  @(SP,12),R1 ;SET PARAMETER P1 INTO REGISTER R1
    ... mov  @(SP,16),R2 ;SET PARAMETER P2 INTO REGISTER R2
    ... trap             ;ISSUE SYSTEM CALL
                         ;CONTENT OF REGISTER R0 IS DATA TO
                          DETERMINE RETURN ADDRESS
ADDRESS AD5 ... mov  @SP+,R1   ;RESTORE CONTENT OF REGISTER R1
    ... mov  @SP+,R2    ;RESTORE CONTENT OF REGISTER R2
    ... mov  #0,FLG     ;CLEAR FLAG INDICATING ISSUE FROM
                         HIGH-LEVEL LANGUAGE INTERFACE ROUTINE
    ... rts
```

FIG. 13

| SYSTEM CALL TYPE | NUMBER OF PARAMETERS |
|---|---|
| FUNCTION CODE OF SYSTEM CALL 1 | 2 |
| FUNCTION CODE OF SYSTEM CALL 2 | 3 |
| FUNCTION CODE OF SYSTEM CALL 3 | 1 |
| ⋮ | ⋮ |

FIG. 17

RETURN ADDRESS TO HIGH-
LEVEL LANGUAGE INTERFACE
ROUTINE

ADDRESS AD4

ADDRESS AD5

ADDRESS AD6

```
SYSTEM CALL1:
    ... mov   R2,@-SP        ;SAVE CONTENT OF REGISTER R2 TO STACK
    ... mov   R1,@-SP        ;SAVE CONTENT OF REGISTER R1 TO STACK
    ... mov   FUNCTION CODE OF SYSTEM CALL 1,R0;
                             SET FUNCTION CODE OF SYSTEM CALL 1INTO REGISTER R0
    ... mov   @(SP,12),R1    ;SET PARAMETER P1 INTO REGISTER R1
    ... mov   @(SP,16),R2    ;SET PARAMETER P2 INTO REGISTER R2
    ... trap                 ;ISSUE SYSTEM CALL
                             ;CONTENT OF REGISTER R0 IS DATA TO
                              DETERMINE RETURN ADDRESS
ADDRESS AD5 ... mov  @SP+,R1 ;RESTORE CONTENT OF REGISTER R1
    ... mov   @SP+,R2        ;RESTORE CONTENT OF REGISTER R2
    ... rts
```

FIG. 23
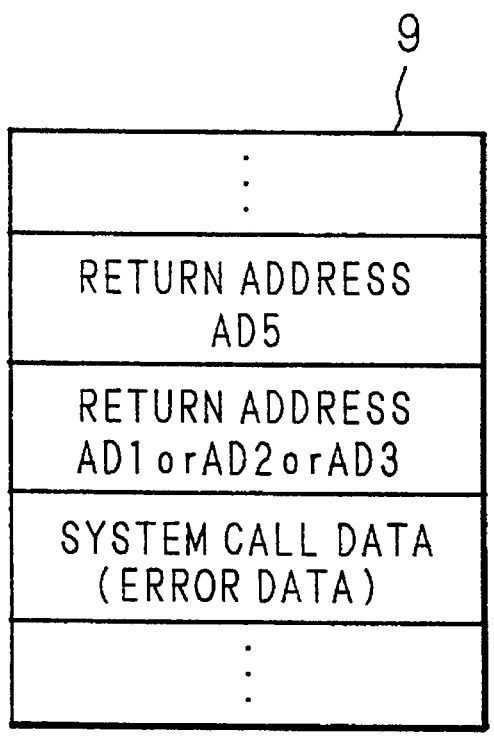
(a)
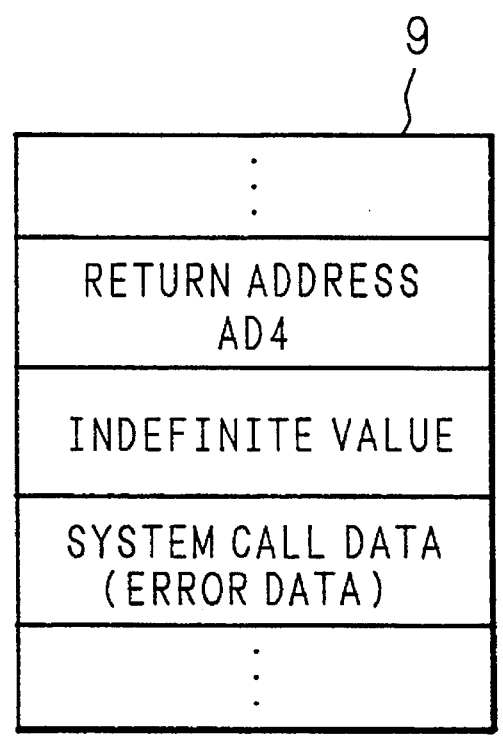
(b)

FIG. 24

| TASK NAME | ACTIVATION OF HIGH-LEVEL LANGUAGE INTERFACE ROUTINE |
|---|---|
| TASK A | NO |
| TASK B | YES |
| TASK C | YES |

DEBUGGING AID APPARATUS

BACKGROUND OF THE INVENTION

1. Field of the Invention

The present invention relates to an apparatus for aiding debugging an application task by fetching system call data including a return address to an application task, the task name that issued the system call, the type of the system call, and the parameters of the system call, when the system call is issued to request an operating system (OS) service.

2. Description of the Related Art

FIG. 1 is a simplified block diagram showing the configuration of a computer equipped with a debugging aid apparatus by fetching system call data. In the figure, the numeral 200 indicates a keyboard from which data is given to a CPU 101 via an I/O 103, and the CPU 101 stores the data into a memory 102.

FIG. 2 is a diagram showing the software configuration of a computer equipped with a debugging aid apparatus according to the prior art. In the example shown, when a system call is issued, or when an error occurs during the execution of a system call instruction, system call data (including error data in the case of an error occurrence) is stored into a table 9 (for example, a ring buffer) in the memory 102. In response to an external request entered from the keyboard 200, system call data display means 11 displays the contents of the table 9 on a display 300.

In FIG. 2, the numeral 7 designates an OS (operating system, particularly the kernel), which includes: a supervisor 71 that user programs use as a means of requesting the services of the OS 7; a memory management routine 72 for managing the memory 102; a data management routine 73 for data management; a process management routine 74 for managing the execution of jobs and processes; and an input/output, management routine 75 for the input/output management of input/output devices. When a system call is issued, or when an interrupt occurs, the OS 7 saves the contents of registers on a stack (not shown), and pushes a return address to an application task onto the top of these data upon completion of the interrupt process. First return-address fetch means 8 fetches from the stack the return address to the application task 6 pushed onto the top of the stack when the system call is issued, while second return-address fetch means 10 fetches from the stack the return address to the application task 6 pushed onto the top of the stack when the interrupt occurs. The fetched return address is stored into the table 9 in the memory 102.

FIG. 3 is a flowchart of the operation performed in the prior art computer with the debugging aid apparatus when an application task requests a service of the OS 7.

First, a system call is issued from the application task 6 (ST51). When the system call is issued, the return address to the application task 6 pushed onto the top of the stack is fetched (ST52). The fetched address is stored into the table 9 in the memory 102 (ST53). Then, control is passed to the supervisor 71 (ST54), and the supervisor 71 interprets the system call instruction (ST55).

Next, system call data including the task name that issued the system call, the type of the system call, the parameters of the system call, etc. is stored into the table 9 (ST56). That is, the system call data is added onto the return address to the application task 6 already stored in the table 9. Finally, the; supervisor 71 passes control to the memory management routine 72, the data management routine 73, the process management routine 74, and the input/output management routine 75, to execute the instruction (ST57).

A processing procedure when an interrupt to request a service of the OS 7 occurs will be described below with reference to the flowchart of FIG. 4.

When an interrupt is requested (ST61), the return address stored at the top of the stack is fetched (ST62). The fetched address is stored into the table 9 (ST63), and control is passed to the supervisor 71 (ST64). The supervisor 71 analyzes the type of the interruption (ST65), and stores data of the interruption, such as the type of interrupt, the interrupted task name, etc., into the table 9 (ST66). The supervisor 71 passes control to the memory management routine 72, the data management routine 73, the process management routine 74, and the input/output management routine 75, to service the interrupt (ST67)

When the application task 6 requests a service of the OS 7 and, executes a system call instruction or interrupt instruction if an error occurs, the processing performed is substantially the same as in the above-described interrupt. For example, when an error occurs during the execution of a system call instruction, the processions shown in a flowchart of FIG. 5 is performed.

First, current error data (an address at which the error occurred, a task that caused the error) are fetched (ST72), and then, the error data are added on the top of the return address of the application task 6 already stored in the table 9 in the memory 102 (ST73). In this manner, the system call data including the error data are stored in the table 9 in the memory 102. When displaying the system call data at a user's request, the system call data display means 11 searches the table 9 and displays the necessary contents.

When the user desires to display the error data, the user enters, for example, a command "show error" from the keyboard 200. In response, the task name that caused the error, the address at which the error occurred, and the address in the application task 6 from which issued the system call, are displayed on the display 300. When displaying the system call issuing situation of the application task 6, the user enters a command "show application-name", for example, from the keyboard 200. In response, the system call data display means 11 displays the type of the issued system call, the parameters of the system call, the system call issuing address of the application task, etc. on the display 300.

FIG. 6 shows an example of a program for issuing a system call to the OS 7 having an assembler interface. As shown, the system call instruction consists or a set of instructions for setting the system call function codes and parameters into respective registers, followed by a software interrupt instruction (trap).

FIG. 7 is a diagram showing the flow of processing performed when the application task 6 written in a high-level language issues a system call through a high-level language interface routine 12. In FIG. 7, the system call issued from the application task 6 calls the supervisor 71 through the high-level language interface routine 12 which converts the application task of the high-level language into executable codes on the computer. In this case, the first return-address fetch means 8 fetches the address of the high-level language interface routine 12, not the system call issuing address of the application task 6, and stores the fetched address into the table 102.

As described, in the computer with the debugging aid apparatus of the prior art, since the system call issued from the application task 6 written in a high-level language calls the supervisor 71 through the high-level language interface routine 12, the address that the first return-address fetch means 8 fetches as the system call issuing address is always the address of the high-level language interface routine 12. In other words, when a system call is issued from one of the application tasks 6, it is not possible to identify the application task 6 that issued the system call, by referencing the address that was fetched by the first return-address fetch means 8 and stored in the table 9. This causes a problem in debugging, when analyzing an error caused by the application task 6 during the execution of the OS 7 service or processing.

SUMMARY OF THE INVENTION

The present invention has been devised to overcome the above problem, and it is an object of the invention to provide an apparatus for aiding debugging an application task by fetching a return address to an application task as system call data when the system call is issued through a high-level language interface from the application task written in a high-level language.

The above and further objects and features of the invention will more fully be apparent from the following detailed description with accompanying drawings.

BRIEF DESCRIPTION OF THE DRAWINGS

FIG. 6 is a program of a system call in a task written in an assembly language;

FIG. 9 is a conceptual diagram illustrating a procedure for issuing a system call in the computer with the debugging aid apparatus of the present invention;

FIG. 12 is an example of a system call instruction program in the high-level language interface routine;

FIG. 13 is a conceptual diagram of a table for storing the function code of a system call with the number of parameters in the system call;

FIG. 17 is a conceptual diagram of a table for storing return addresses to the high-level language interface routine;

FIG. 19 is an example of a system call instruction program in a high-level language interface routine;

FIG. 23A is a conceptual diagram showing the contents of the table when issuing a system call has been issued through the high-level interface routine;

FIG. 23B is a conceptual diagram showing the contents of the table when issuing a system call without passing the high-level interface routine;

FIG. 24 is a conceptual diagram of a table for storing the task name with an information whether the task issues a system call through the high-level language interface routine;

DESCRIPTION OF THE PREFERRED EMBODIMENTS

The present invention will now be described below with reference to the drawings illustrating the preferred embodiments thereof.

Figure 1:
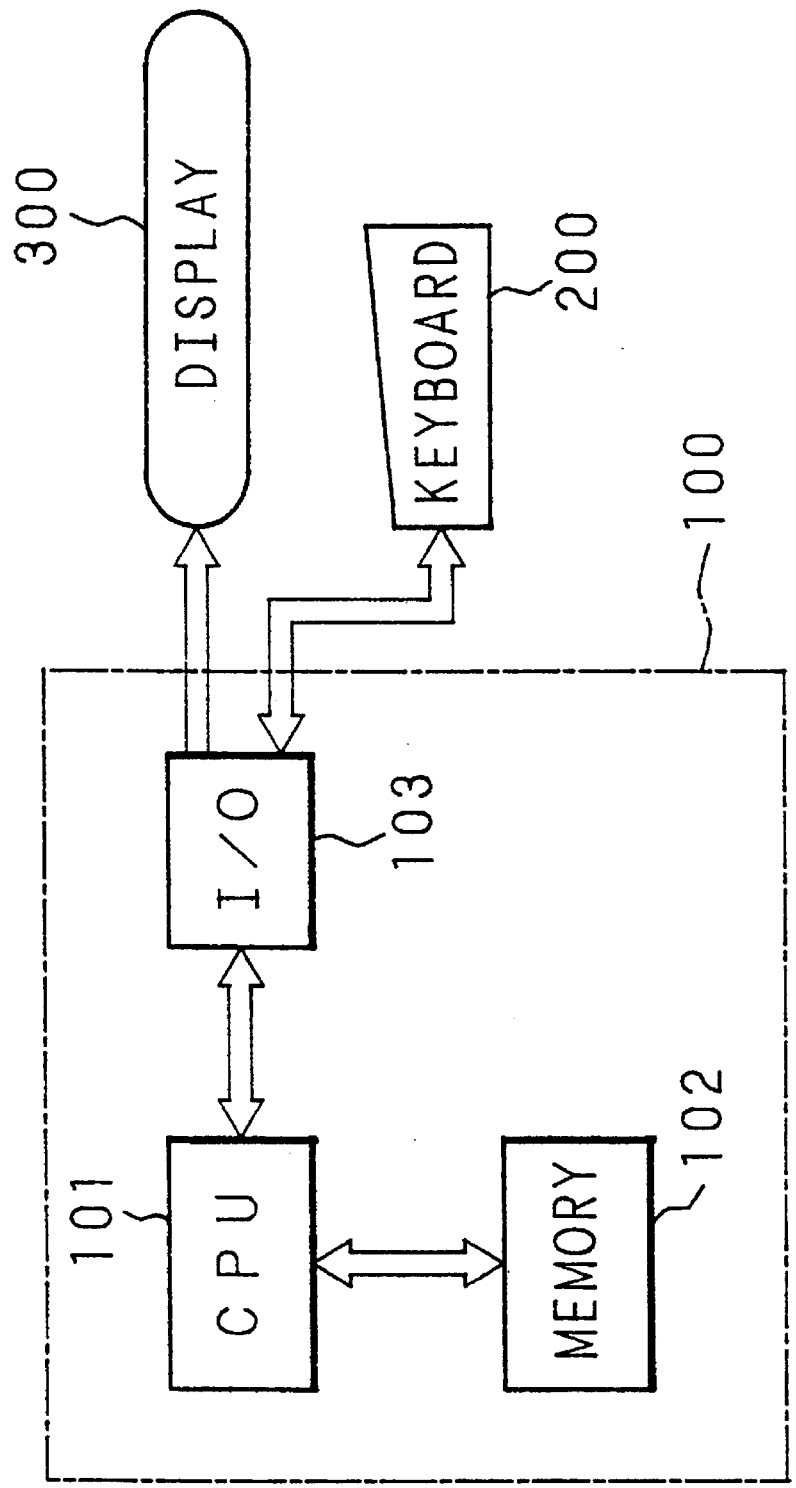
FIG. 1 is a block diagram showing the hardware configuration of a computer equipped with a debugging aid apparatus by fetching system call data.
Figure 2:
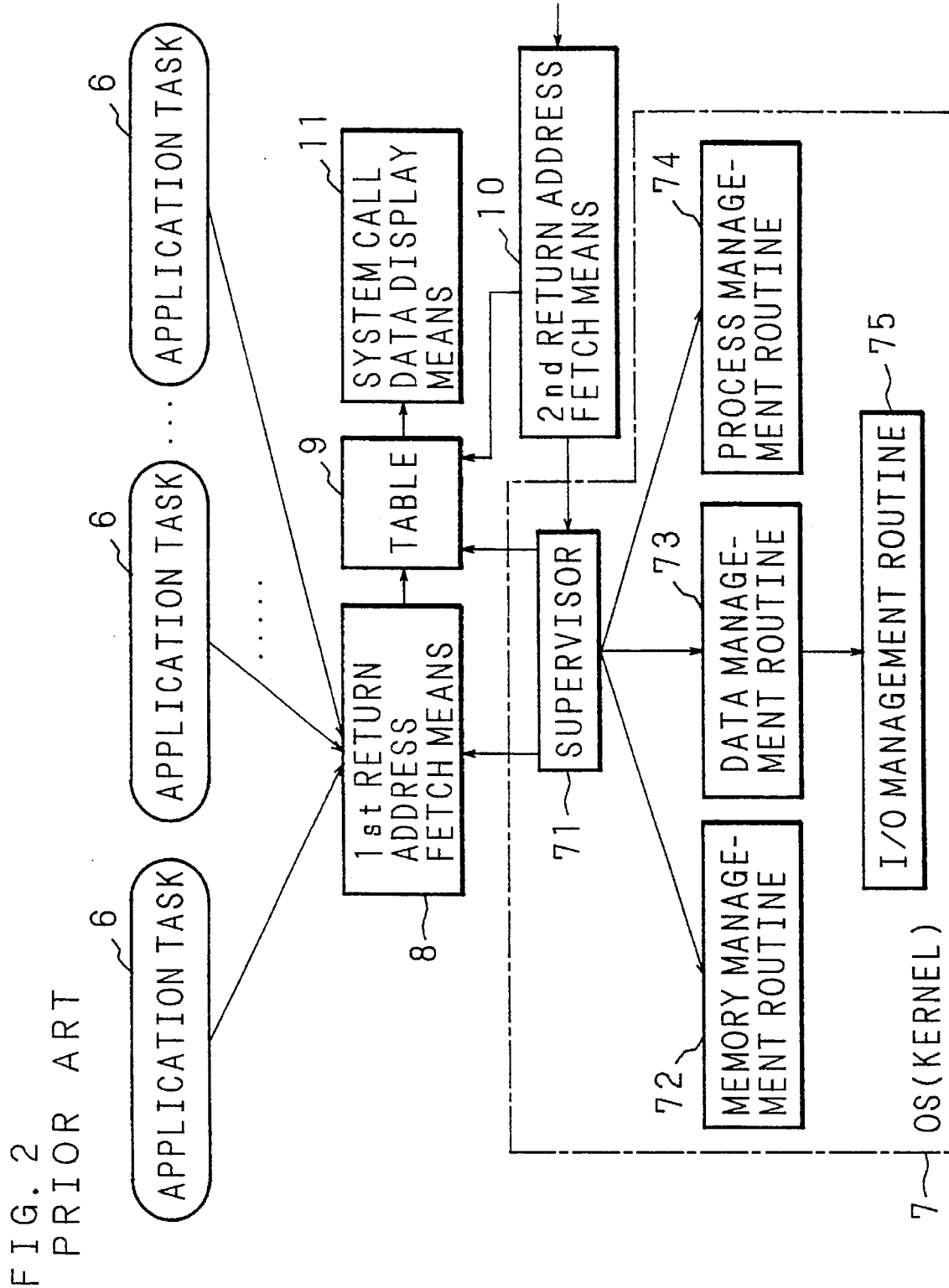
FIG. 2 is a block diagram showing the software configuration of a computer equipped with a debugging aid apparatus according to the prior art.
Figure 3:
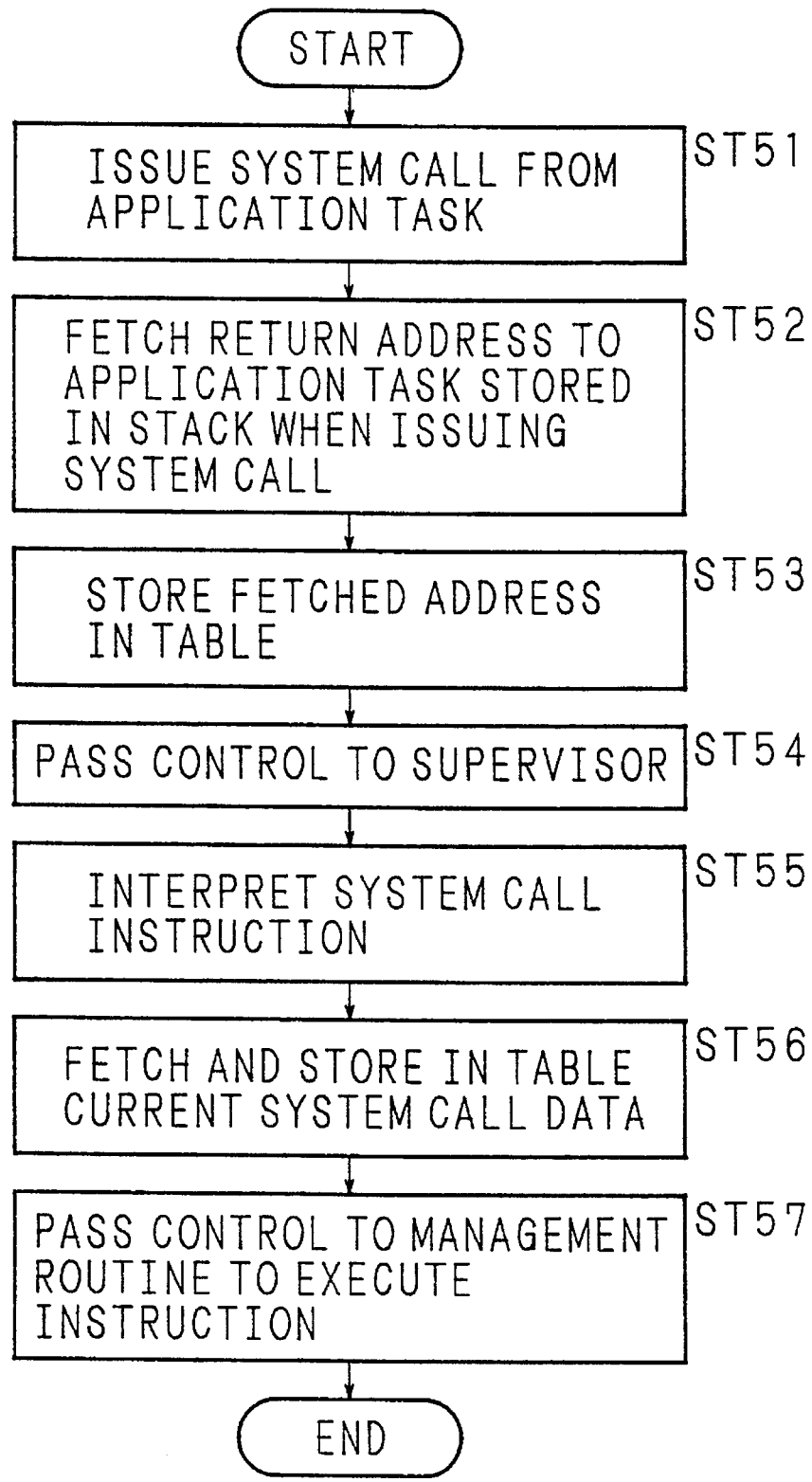
FIG. 3 is a flowchart illustrating the operation performed in the computer with the debugging aid apparatus of the prior art when an application task requests an OS service.
Figure 4:
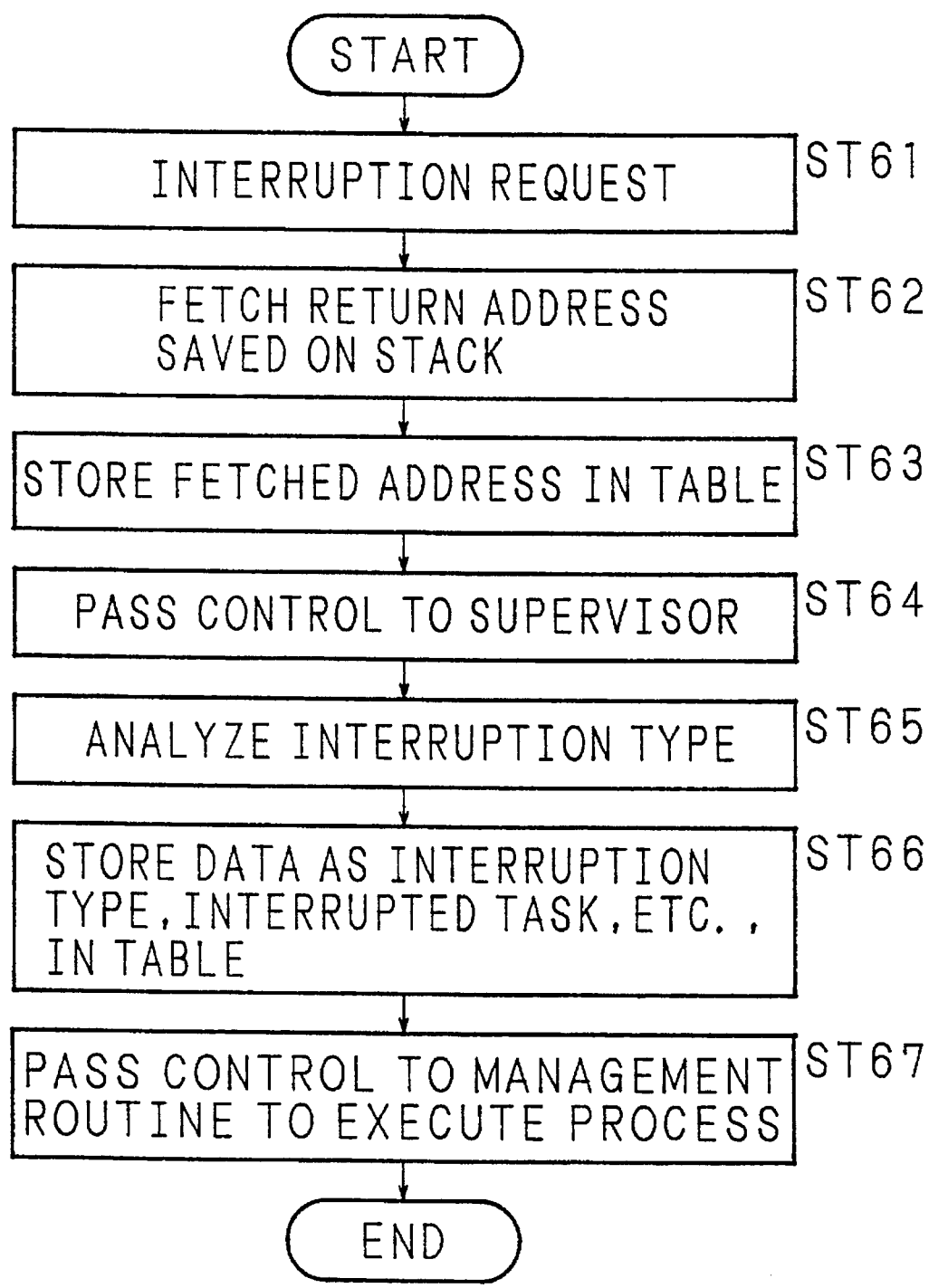
FIG. 4 is a flowchart illustrating the operation performed in the computer with the debugging aid apparatus of the prior art when an interrupt occurs.
Figure 5:
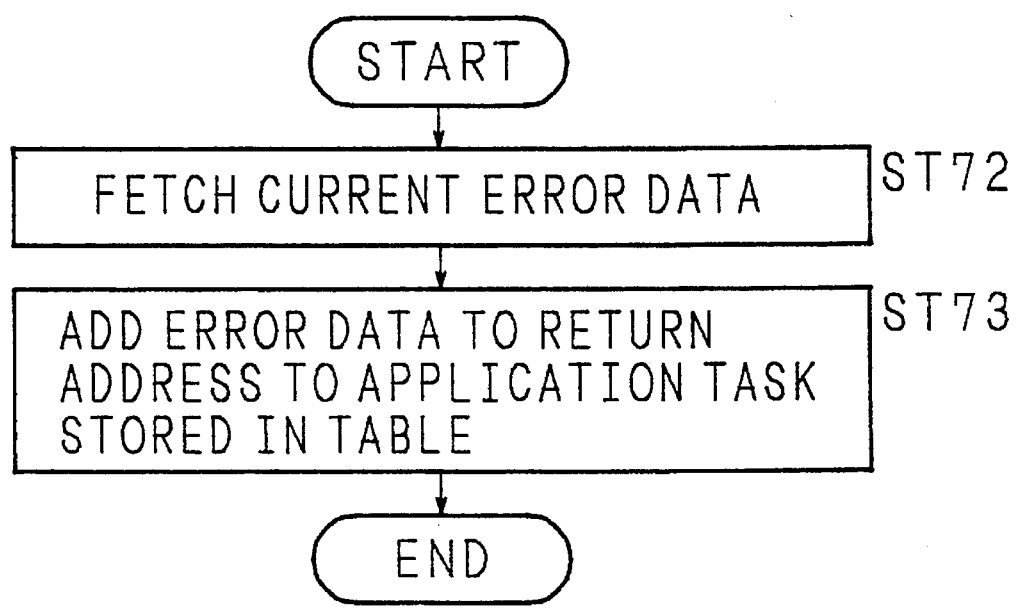
FIG. 5 is a flowchart illustrating the operation performed in the computer with the debugging aid apparatus of the prior art when an error occurs.
Figure 7:
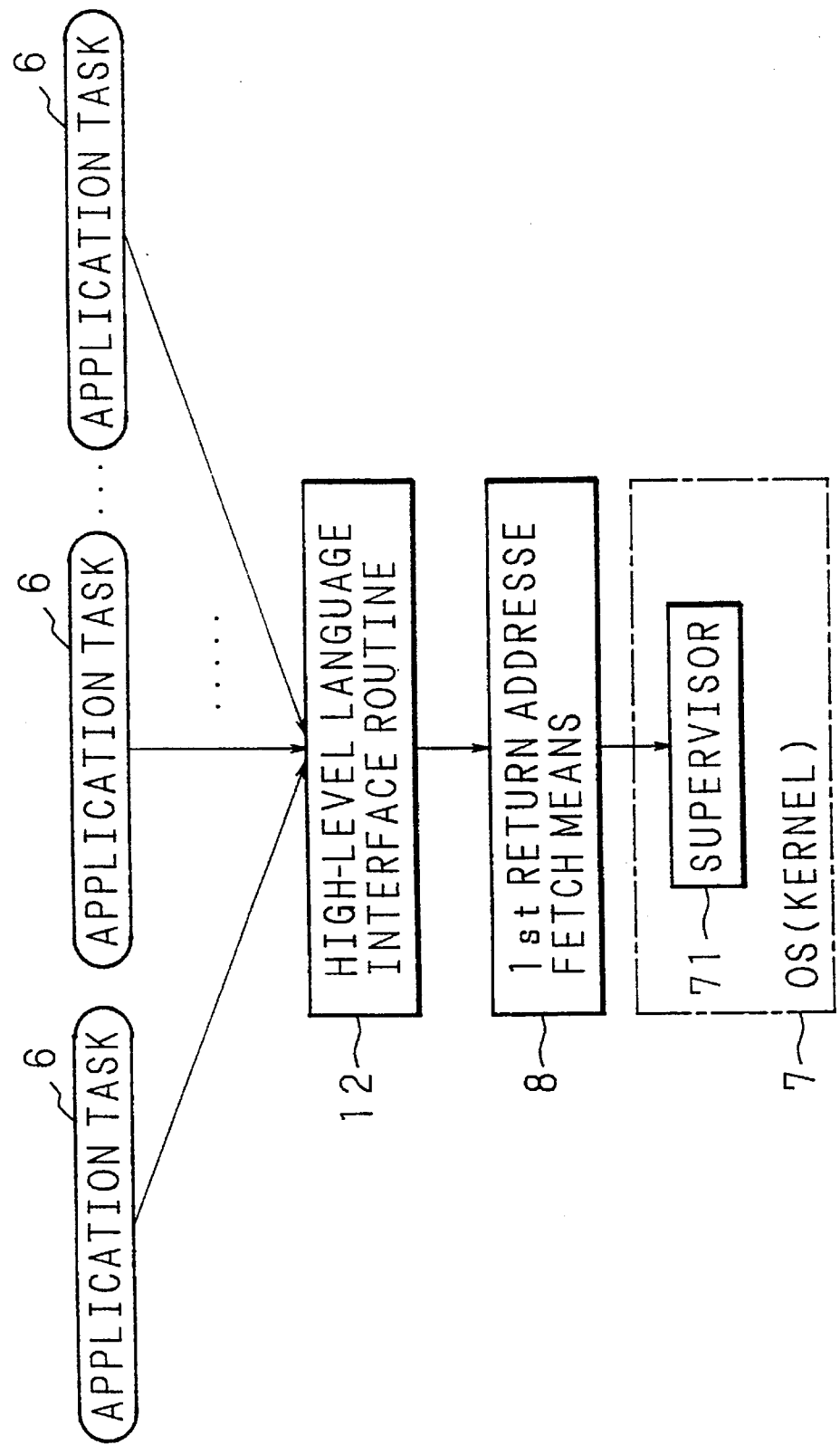
FIG. 7 is a block diagram showing tile flow of processing performed in the computer with the debugging aid apparatus of the prior art when a system call is issued from a task written in a high-level language.
Figure 8:
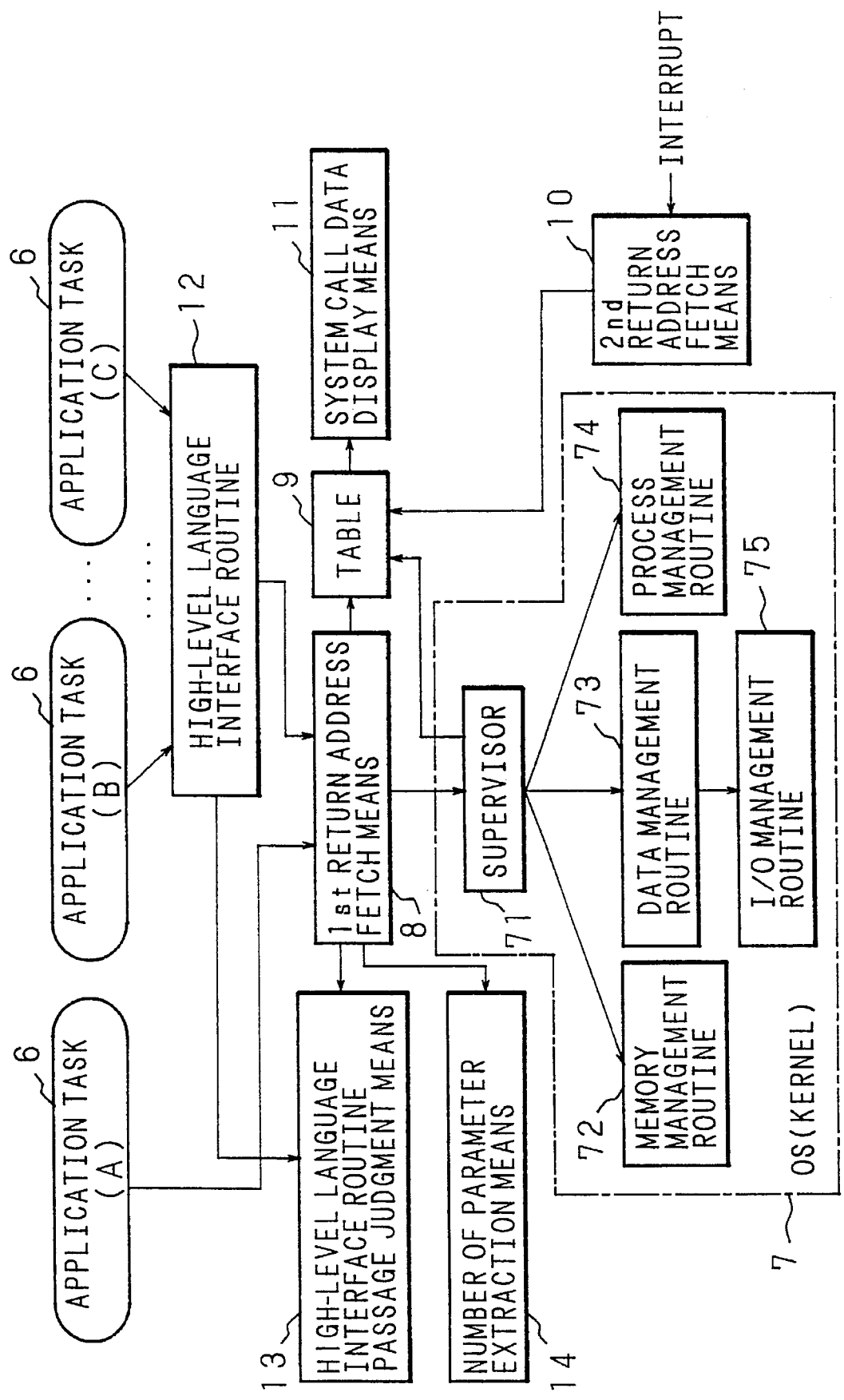
FIG. 8 is a block diagram showing the software configuration of a computer equipped with a debugging aid apparatus according to a first embodiment of the present invention.

FIG. 8 is a block diagram showing the configuration of a computer equipped with a debugging aid apparatus according to a first embodiment of the invention. In the figure, the numeral 7 designates an OS (particularly, the kernel), which includes: a supervisor 71 that user programs use as a means of requesting the services of the OS 7; a memory management routine 72 for memory management; a data management routine 73 for data management; a process management, routine 74 for controlling the execution of jobs and processes; and an input/output management routine 75 for managing input/output devices.

When a system call is issued, or when an interrupt occurs, the OS 7 saves the contents of registers on a stack (not shown), and pushes onto the top of the data in the slack a return address to the application task upon completion of the interrupt process. First return-address fetch means 8 fetches the return address to the application task pushed onto the top of the stack when the system call is issued, while second return-address fetch means 10 fetches the return address to the application task pushed onto the top of the stack when the interrupt occurs. The fetched return address is stored into a table 9 in memory. System call data display means 11 displays the contents of the table 9. A high-level language interface routine 12 converts the application task written in a high-level language into codes that can be executed on the computer. Furthermore, when a system call is issued from the high-level language application task, the high-level language interface routine 12 fetches the return address to the high-level language application task from the base of the stack, and stores the fetched address into the table 9.

A high-level language interface routine passage judgment means 13 judges whether the system call is issued through the high-level language interface routine 12 or directly issued without passing the high-level interface routine 12. Number of parameter extraction means 14 stores the number of parameters for each system call type in the form as shown in FIG. 13 in the table 9, and extracts the number of parameters for a particular system call according to the type of the system call.

FIG. 9 is a conceptual diagram illustrating a system call issuing procedure when an application task A written in an assembly language directly issues a system call to the OS 7 without passing the high-level language interface routine 12, or when application tasks B or C written in a high-level language issues a system call to the OS 7 through the high-level language interface routine 12. Addresses AD1 through AD4 each designate the address (return address) next to the system call issuing address of the corresponding application task, and address AD5 is the address (return address) next to the issuing address of the system call from the high-level language interface routine 12.

Figure 10B:
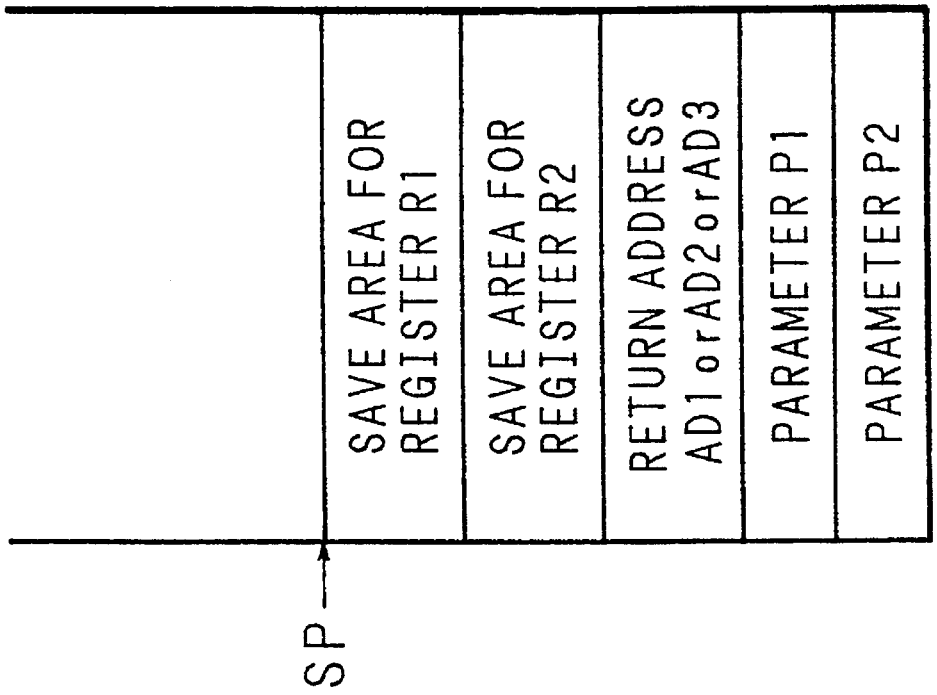
FIG. 10B is a conceptual diagram showing the stack contents immediately before a system call is issued from the high-level language interface routine.
Figure 10A:
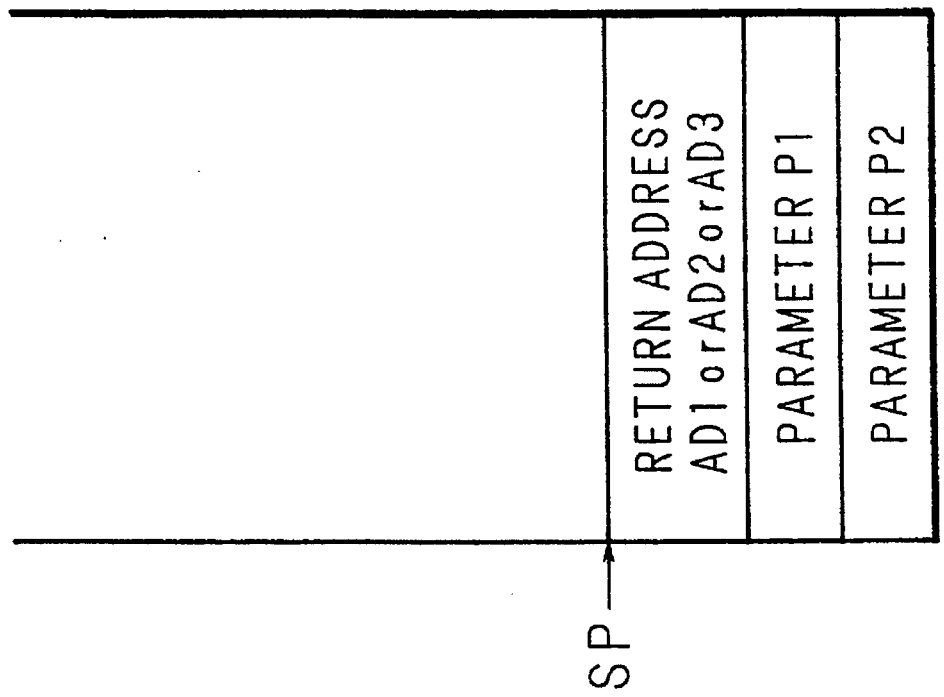
FIG. 10A is a conceptual diagram showing the stack contents when a high-level language interface routine is called from a high-level language application task.

FIG. 10A is a conceptual diagram showing the contents of the stack when the high-level language interface routine 12 is called from the high-level language application task 6, and FIG. 10B is a conceptual diagram showing the contents of the stack immediately before the high-level language interface routine 12 issues a system call to the OS 7.

Figure 11B:
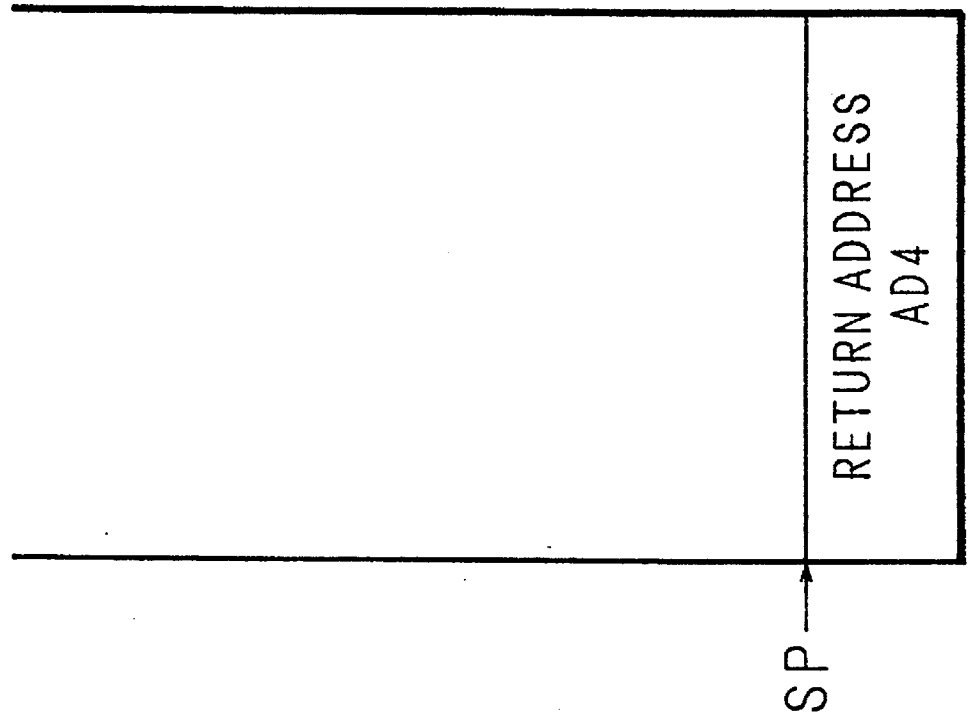
FIG. 11B is a conceptual diagram showing the stack contents when the system call instruction is directly executed without passing the high-level language interface routine.
Figure 11A:
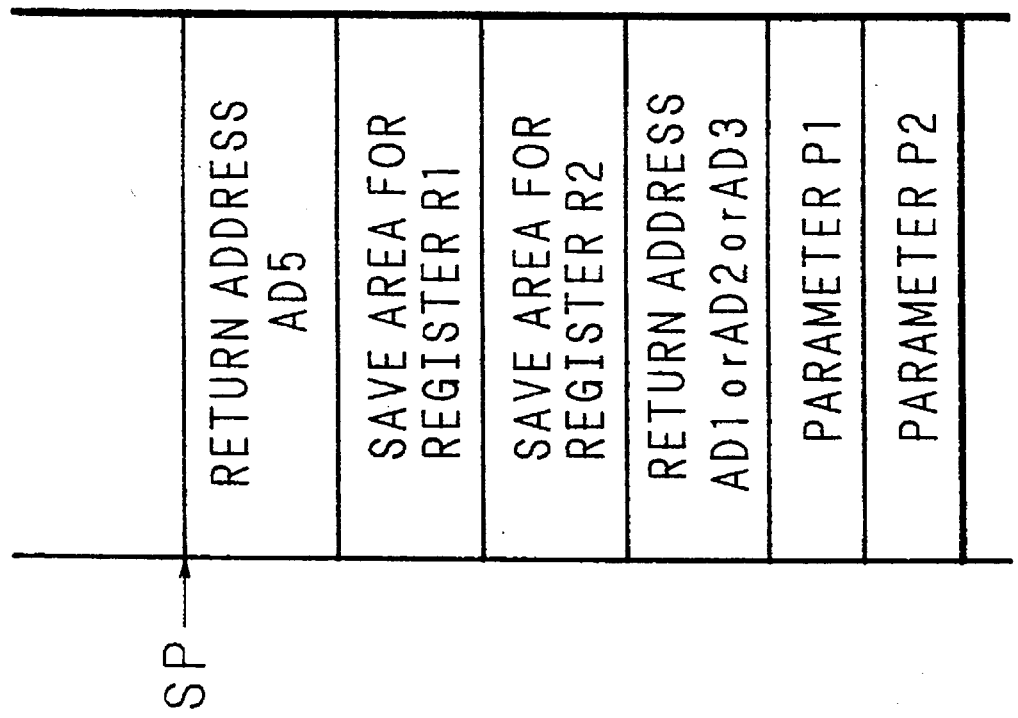
FIG. 11A is a conceptual diagram showing the stack contents when a system call instruction issued from the high-level language interface routine is executed.

FIG. 11 is a conceptual diagram showing the contents of the stack when the return address to the application task 6 is fetched when issuing a system call: FIG. 11A shows the contents of the stack when the system call is issued From the high-level language interface routine 12, and FIG. 11B when the system call is issued directly.

FIG. 11B shows the contents of the stack when the system call is issued directly from the assembly language application task without passing the high-level language interface routine 12. Since registers can be directly operated in an assembly language, and all system call parameters are set into the registers, only the return address AD4 from the trap instruction is pushed onto the stack.

FIG. 12 is an example of a program when the high-level interface routine 12 issues a system call 1. Flag FLG indicating the issuing from the high-level language interface routine 12 will be described later. As shown in FIG. 12, since registers cannot be directly operated in a high-level language, the contents of registers R1 and R2 immediately before the issuing of the system call are saved on the stack, after which the function codes and parameters of the system call are set into the registers R0 through R3, and then, a software interrupt instruction (trap) is executed to issue the system call to the OS 7.

The following describes the condition of the stack when the high-level language application task 6 issues the system call 1 (parameter P1, parameter P2). First, SP (stack pointer) is shifted upward (to a smaller address) by predetermined addresses, and the second parameter P2 is stacked at that address. Then, the SP is further shifted upward by predetermined addresses, and the first parameter P1 is stacked. Then, when the high-level language interface routine 12 is activated by the system call 1, the SP is further shifted upward by predetermined addresses, and the return address (AD1, AD2, or AD3) of the application task 6 is stacked (see FIG. 10A).

Next, in order to store the parameters into the registers, the values of the register R2 (for storing parameter P2) and register R1 (for storing parameter P1) are successively saved on the stack while shifting the SP upward (see FIG. 10B ).

After storing the parameters P1 and P2 into the respective registers R1 and R2, when the trap instruction is executed, the SP is shifted further upward and the return address to the high-level language interface routine 12 is pushed onto the stack (see FIG. 11A).

However, in debugging to trace which application task issues the system call, it is not possible to determine from the return address the address on the application task from which the system call was issued, since the return address to the high-level language interface routine 12 is pushed onto the top of the stack when the same type of system call is issued from more than one address through the high-level language interface routine 12, as shown in FIG. 9.

To solve this problem, the present invention provides a flag FLG (see FIG. 12) to indicate whether the system call has been issued through the high-level language interface routine 12. When a system call is issued, the value of the FLG is examined; if the flag is set, it is determined that the system call has been issued from the high-level language interface routine 12, and the number of system call parameters is obtained from the type of the system call function code to obtain the return address to the application task 6. Each system call type is stored with the number of system call parameters in the form as shown in FIG. 13 in the table 9. Then, the address of the stack where the return address to the high-level language interface routine 12, the system call parameters, and the return address to the application task 6 are pushed in this order from the top, is incremented by addresses proportional to the number of parameters, and the return address to the application task 6 is fetched from the base of the stack and the fetched address is stored into the table 9. On the other hand, if the FLG is not set, the system call is issued directly from the assembly language application task; therefore, the return address to the application task stored at the address pointed to by the SP is stored into the table 9.

Figure 14:
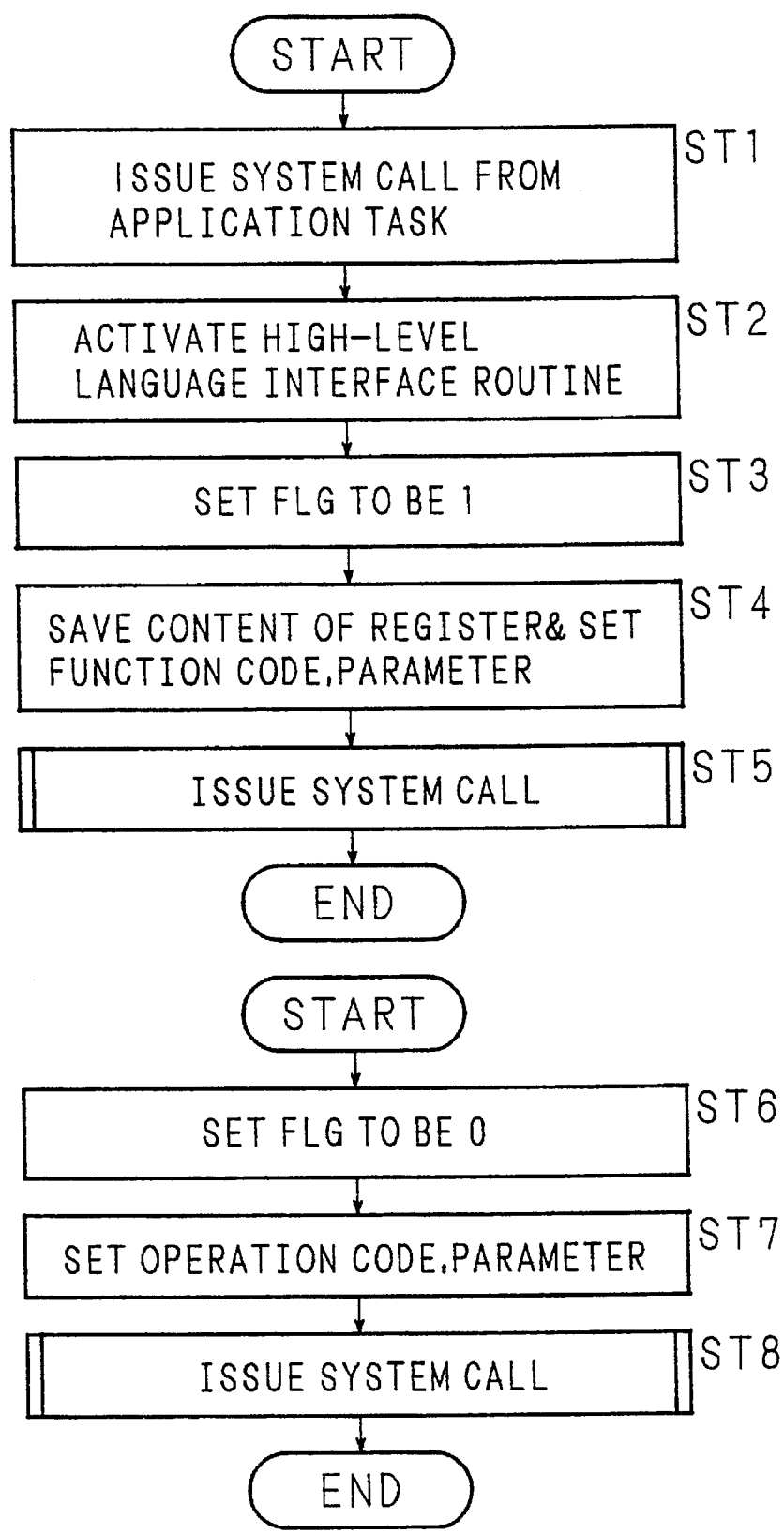
FIG. 14 is a flowchart illustrating the operation of the computer with the debugging aid apparatus of the present invention.
Figure 15:
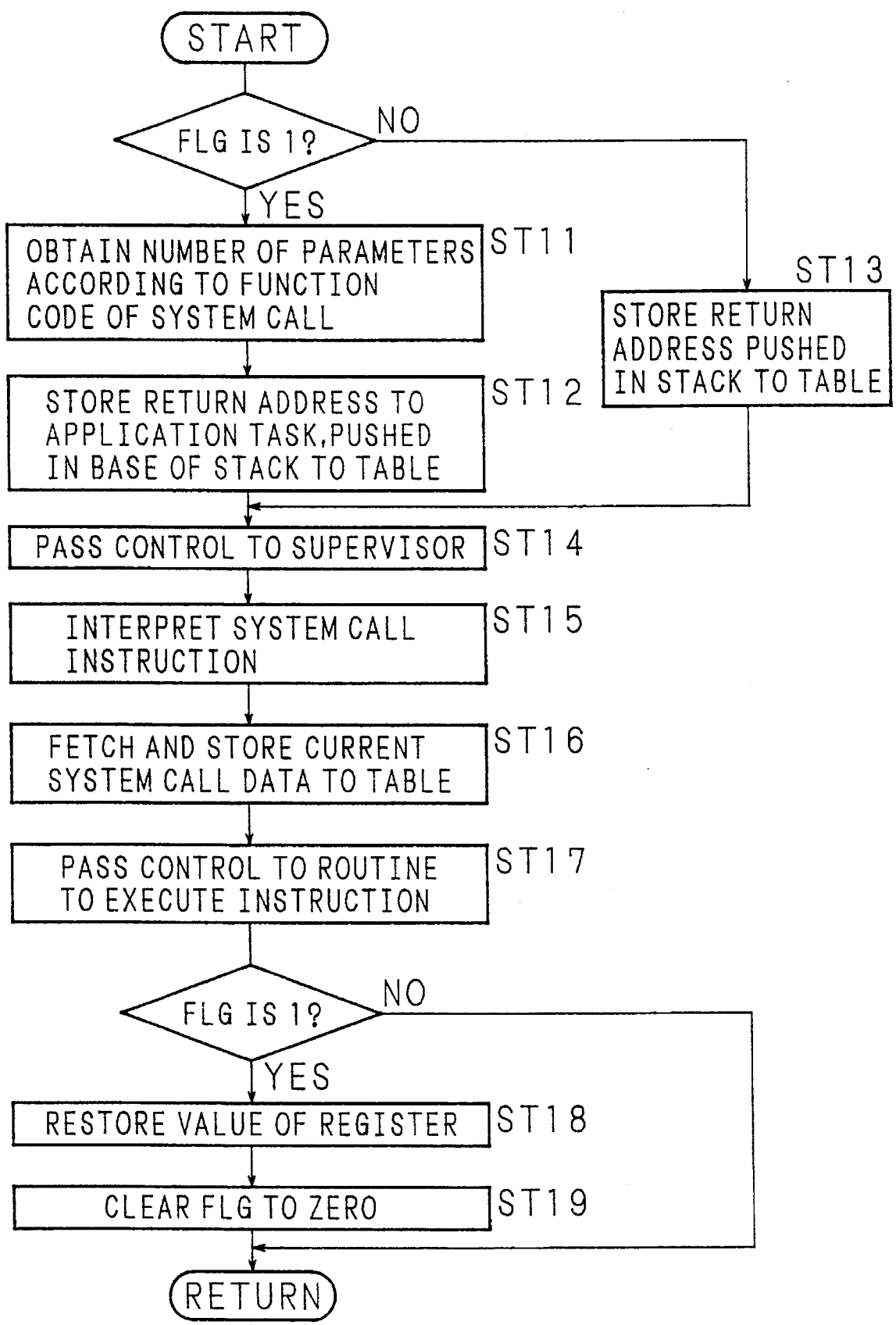
FIG. 15 is a detailed flowchart illustrating the operation of the computer with the debugging aid apparatus according to the first embodiment of the invention when issuing the system call.

The above procedure will be described in sequence with reference to the flowcharts of FIGS. 14 and 15, the conceptual diagram of FIG. 9, the conceptual diagrams of FIGS. 10 and 11 showing the contents of the stack, and the program of FIG. 12.

The application task 6 issues a system call (ST1). First, we will describe the case where the system call 1 having two parameters is issued From the high-level language application task B or C shown in FIG. 9.

When the system call 1 (parameter P1, parameter P2) is issued, the high-level language interface routine 12 as shown in FIG. 12, is activated (ST2). The high-level language interface routine 12 is provided one for each system call type.

As shown in FIG. 10A, the stack stores the parameters P1 and P2 of the system call 1, and the return address to the application task 6 that issues the system call (in this example, one of addresses AD1 through AD3 shown in FIG. 9). The high-level language interface routine 12 then sets the flag (FLG) to indicate that the system call has been issued from the high-level language interface routine 12 (ST3). After saving the contents of the registers R2 and R1 on the stack, the function codes of the system call 1 are set into the register R0, and the parameters of the system call on the registers R1 and R2 (ST4). The current contents of the stack are shown in FIG. 10B. A software interrupt is generated by the trap instruction, to issue the system call (ST5). The procedure with issuing the system call will be described in detail later.

On the other hand, we will describe the case where the system call is directly issued without passing the high-level language interface routine 12. When the system call 1 having two parameters is issued from the assembly language application task A (address AD4) shown in FIG. 9, FLG is set to be 0(zero) (ST6), the function codes and parameters are set into the respective registers (ST7), and the system call is issued (ST8).

Next, the procedure with issuing the system call (step ST5 or ST8 in FIG. 14) will be described in detail with reference to FIG. 15.

First, when the system call is issued, the return address to the application task 6 from the system call is saved on the stack. The contents of the stack after the system call has been issued from the high-level language interface routine are shown in FIG. 11A, and the contents of the stack after the system call has been issued from the assembly language application task are shown in FIG. 11B. By judging the FLG is set ("1"), and if the FLG is set, it is determined that the system call has been issued from the high-level language interface routine 12, and the number of system call parameters is obtained from the function codes of the system call by looking up the table shown in FIG. 13 (ST11).

In the present embodiment, the number of parameters in the system call 1 is "2". The return address (AD1, AD2, or AD3) near the base of the stack is fetched and stored into the table 9 in memory (ST12). To put it concretely, when it is assumed that the stack stores one item of data for every Four addresses, the contents of the address X (X=stack pointer (SP)+4+number of parameters×4) are stored in the table 9.

Next, control is passed to the supervisor 71 (ST14). The supervisor 71 interprets the type of the system call (ST15), and stores the current system call data, i.e. the type of the system call and the task name that issued the system call, into the table 9 (ST16). The supervisor 71 passes control to the memory management routine 72, the data management routine 73, the process management routine 74, and the input/output management routine 75, to execute a process accompanied with the interrupt (ST17). When the processing of the system call is complete, control returns to the high-level language interface routine 12. The high-level language interface routine 12 then restores the register values saved on the slack (ST18). The FLG indicating the system call issuing from the high-level language interface routine 12 is cleared to be 0(zero) (ST19).

On the other hand, when the system call is directly issued without passing the high-level language interface routine 12, the value of FLG is "0"; it is therefore determined that the system call has been directly issued without passing the high-level language interface routine 12. Then, the return address AD4 stored in the stack shown in FIG. 11B is fetched and stored into the table 9 (ST13), control is passed to the supervisor 71 (ST15), the system call instruction is interpreted (ST15), and the system call data, i.e., the type of the system call, the system call parameters, and the task name that issued the system call, are fetched and stored into the table 9 in memory (ST16).

The supervisor 71 passes control to the memory management routine 72, the data management routine 73, the process management routine 74, and the input/output management routine 75, to execute a process accompanied with the interrupt (ST17). When the processing of the system call is complete, control returns to the application task 6.

As described above, the return address stored in the table 9 in memory is one of the addresses AD1 through AD4 on the application tasks 6, but not the address AD5 on the high-level language interface routine 12. The system call data stored in the table 9 is displayed using the system call data, a display means 11.

When displaying error data, the user enters a command "show error", for example. With this command, the task name that caused the error, the address at which the error occurred, and the address in the application task 6 that issued the system call, are displayed. When it is desired to display the system call issuing situation of the application task 6, upon entering of a command "show application name", for example, the system call data display means 11 displays the type of the issued system call, the parameters of the system call, the address in the application task 6 that issued the system call, etc.

Further, when an error occurs during the execution of the system call, error data (such as the address at which the error occurred, the task name that caused the error, etc.) that is able to fetch at the time of the error occurrence are fetched and added to the table 9 in memory. When an interrupt occurs, the return address saved on the stack is fetched and stored into the table 9. The supervisor 71 to which control has been passed examines the type of interrupt, and stores data, such as the type of interrupt and interrupted task name, into the table 9.

Figure 16:
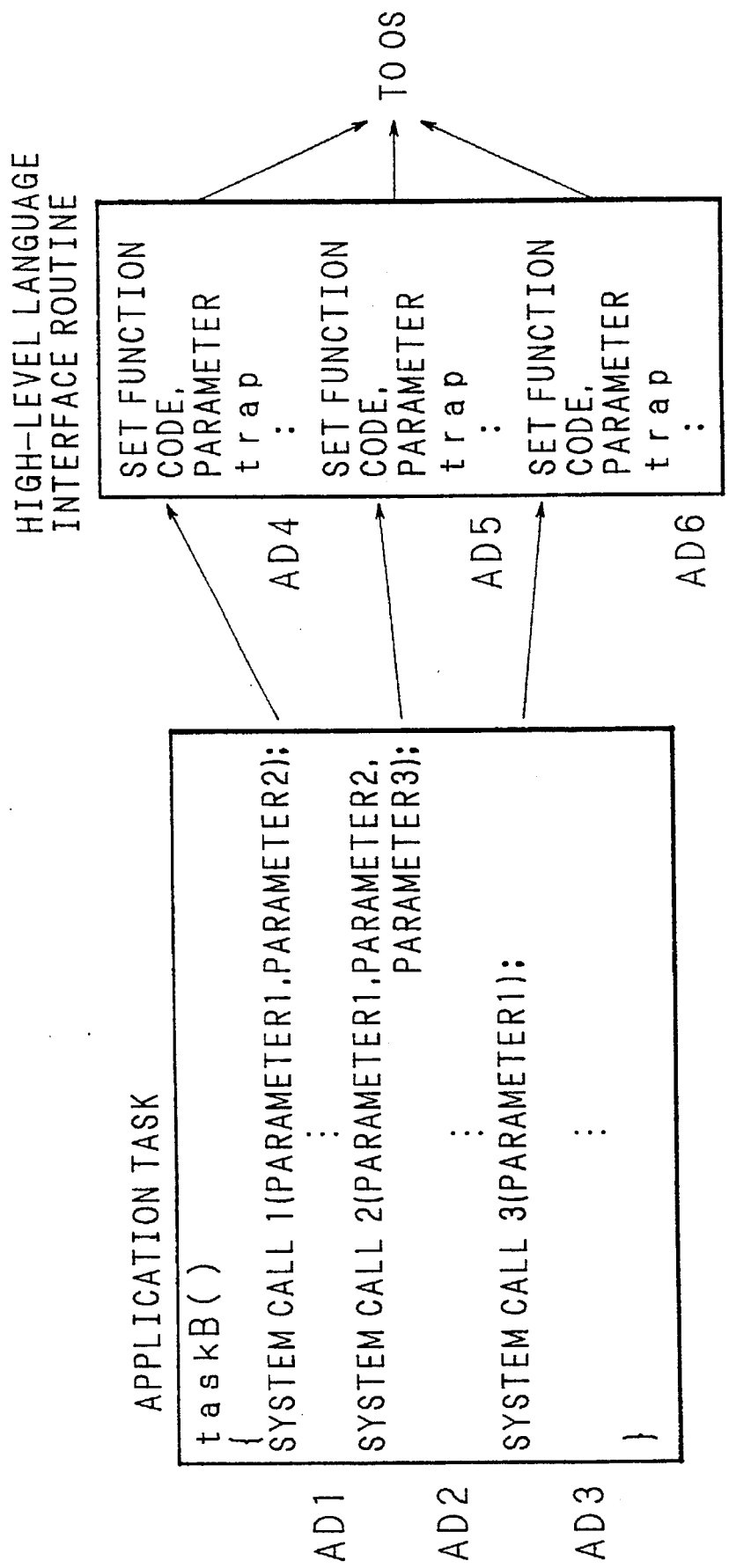
FIG. 16 is a conceptual diagram showing the flow of processing performed when plural kinds of system calls are issued through the high-level language interface routine.

Though, in the present embodiment, the flag FLG is used to indicate whether the system call is issued through the high-level language interface routine 12, an alternative configuration may be used to accomplish the same purpose; that is to determine whether the system call has been issued through the high-level language interface routine 12, by managing the return address to the high-level language interface routine 12 in the form of a table, as shown in FIGS. 16 and 17, and by examining the address saved at the top of the stack after the issuing of the system call (address AD5 in FIG. 11A, address AD4 in FIG. 11B) matches any of the addresses stored in the table. If it matches any, it is determined that the system call is issued through the high-level language interface routine 12.

Figure 18:
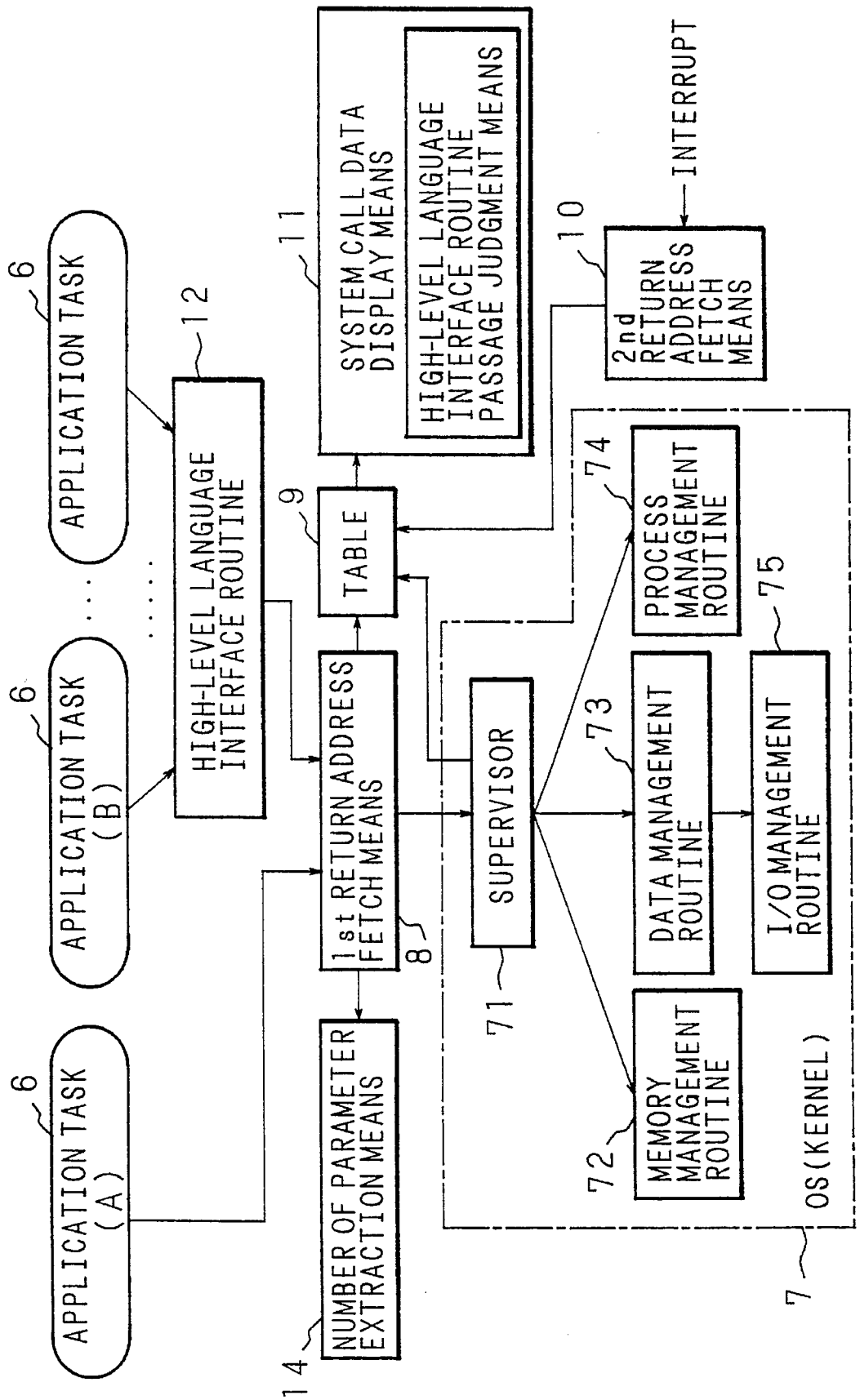
FIG. 18 is a block diagram showing the software configuration of a computer with a debugging aid apparatus according to a second embodiment of the present invention.

FIG. 18 is a block diagram showing the software configuration of a computer with a debugging aid apparatus a second embodiment of the invention. The difference of this embodiment from the first embodiment is that the means for judging the passage through the high-level language interface routine 12 is incorporated in the system call data display means 11. The same parts as those used in the first embodiment are designated by the same numerals, and description of such parts will not be repeated here.

FIG. 19 shows an example of a program of the high-level language interface routine 12. When the system call 1 (parameter P1, parameter P2) is issued from an application task written in a high-level language, the high-level language interface routine 12 shown in FIG. 19 is activated. The contents of the stack at this time are as shown in FIG. 10A. Next, in the high-level language interface routine 12 the contents of the registers R1 and R2 are saved on the stack, the function codes of the system call 1 are set into the register R0 and the system call parameters into the registers R1 and R2, and the trap instruction is executed to issue the system call.

The operation of the second embodiment will be described below with reference to the flowcharts of FIGS. 20 and 21, and the conceptual diagrams of the table 9 shown in FIGS. 22 and 23.

Figure 20:
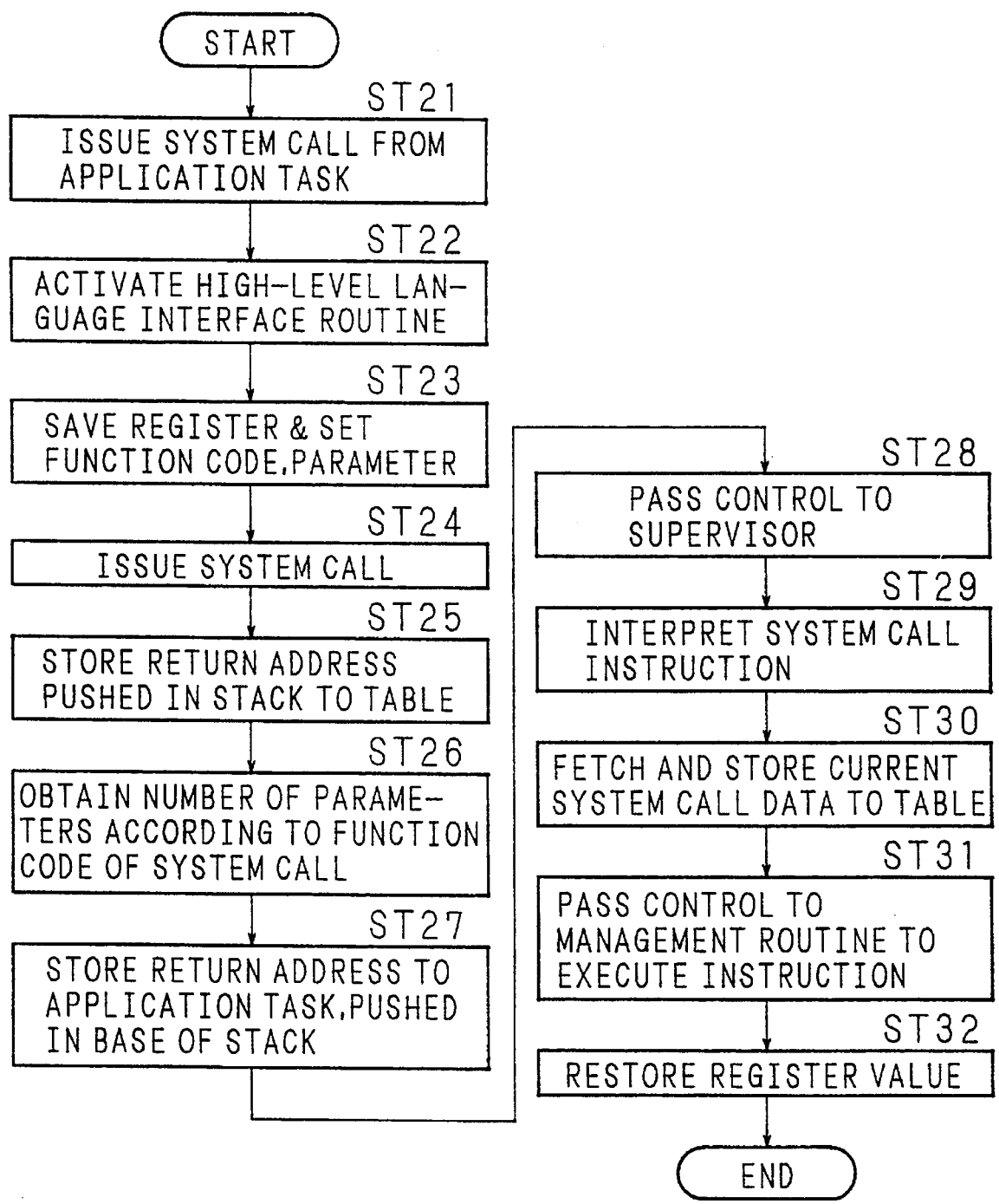
FIG. 20 is a flowchart illustrating the operation performed in the computer with the debugging aid apparatus according to the second embodiment of the invention, when issuing a system call through the high-level interface routine.

FIG. 20 is a flowchart illustrating the operation of the second embodiment when the system call is issued through the high-level language interface routine 12. The following describes the case where the system call 1 having two parameters is issued from the high-level language application task B or C, as in the first embodiment. The system call is issued from the application task 6 (ST21), and the high-level language interface routine 12 is activated (ST22). Next, after saving tile register contents, the function codes and tile parameters are set into the respective registers (ST23), and the trap instruction is executed to issue the system call (ST24). As in the first embodiment, the contents of the stack after the system call has been issued from the high-level language interface routine 12 are as shown in FIG. 11A. The return address (AD5) pushed onto the stack is fetched and stored into the table 9 (area 1 in FIG. 22) (ST25). The number of parameters corresponding to the type of the system call is obtained from the table shown in FIG. 13 (ST26).

As in the first embodiment, from the stack address incremented by addresses proportional to the number of parameters, the return address (AD1, AD2, or AD3) pushed near the base of the stack is fetched and stored into the table 9 (area 2 in FIG. 22) (ST27). As in the first embodiment, after system call data is fetched and added to the table 9 in memory, control is passed to the supervisor 71 (ST28). The supervisor 71 interprets the system call instruction (ST29), and system call data, i.e. the system call parameters and the system call issuing task name, is fetched and stored into the table 9 (ST30). The supervisor 71 passes control to the memory management routine 72, the data management routine 73, the process management routine 74, and the input/output management routine 75, to execute a process accompanied with the interrupt (ST31). When the processing of the system call is complete, control is returned to the high-level language interface routine 12. The high-level language interface routine 12 then restores the resistor values (ST32).

Figure 21:
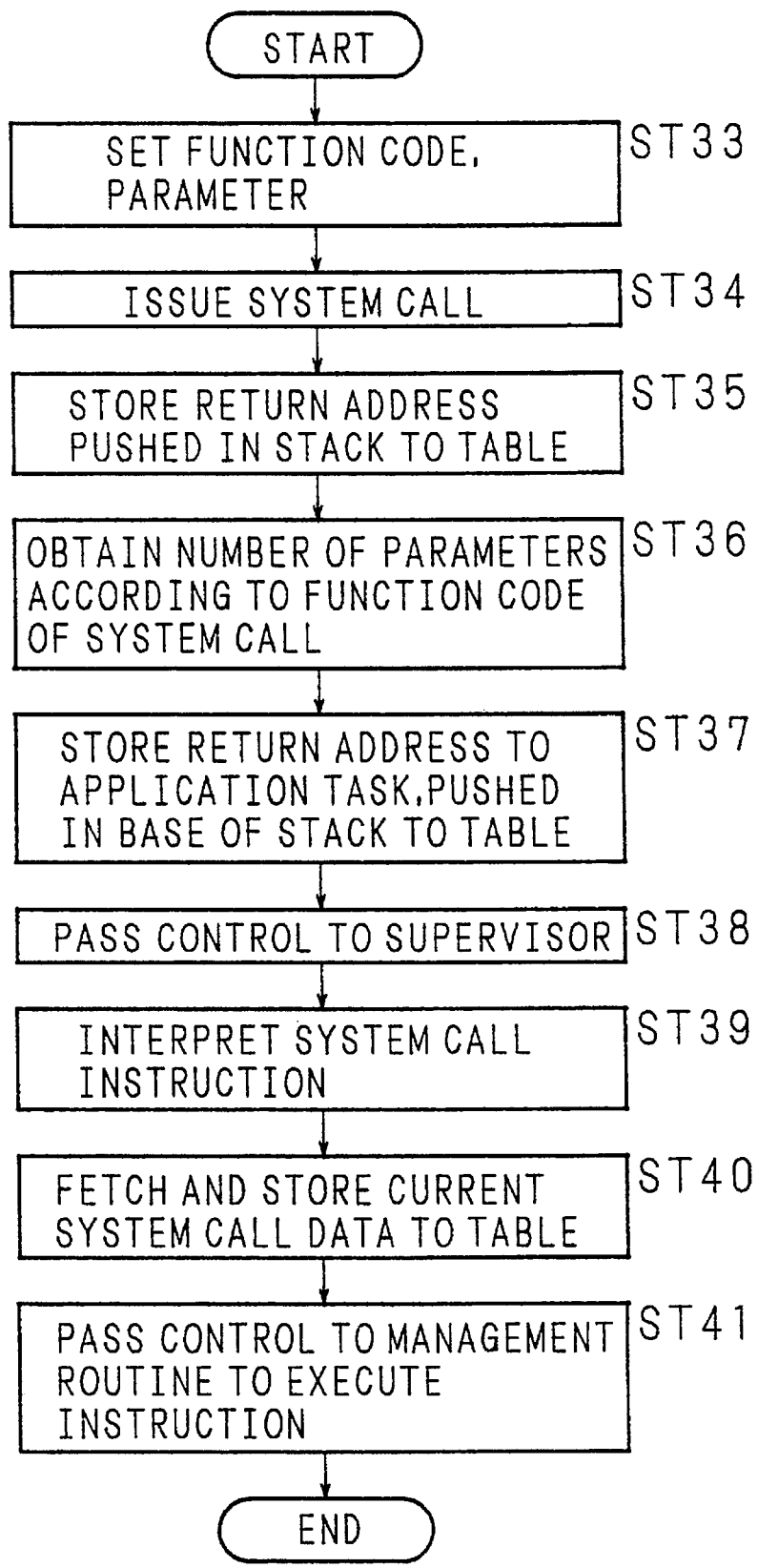
FIG. 21 is a flowchart illustrating the operation performed in the computer with the debugging aid apparatus according to the second embodiment of the invention when issuing a system call without passing the high-level interface routine in the second embodiment of the invention.
Figure 22:
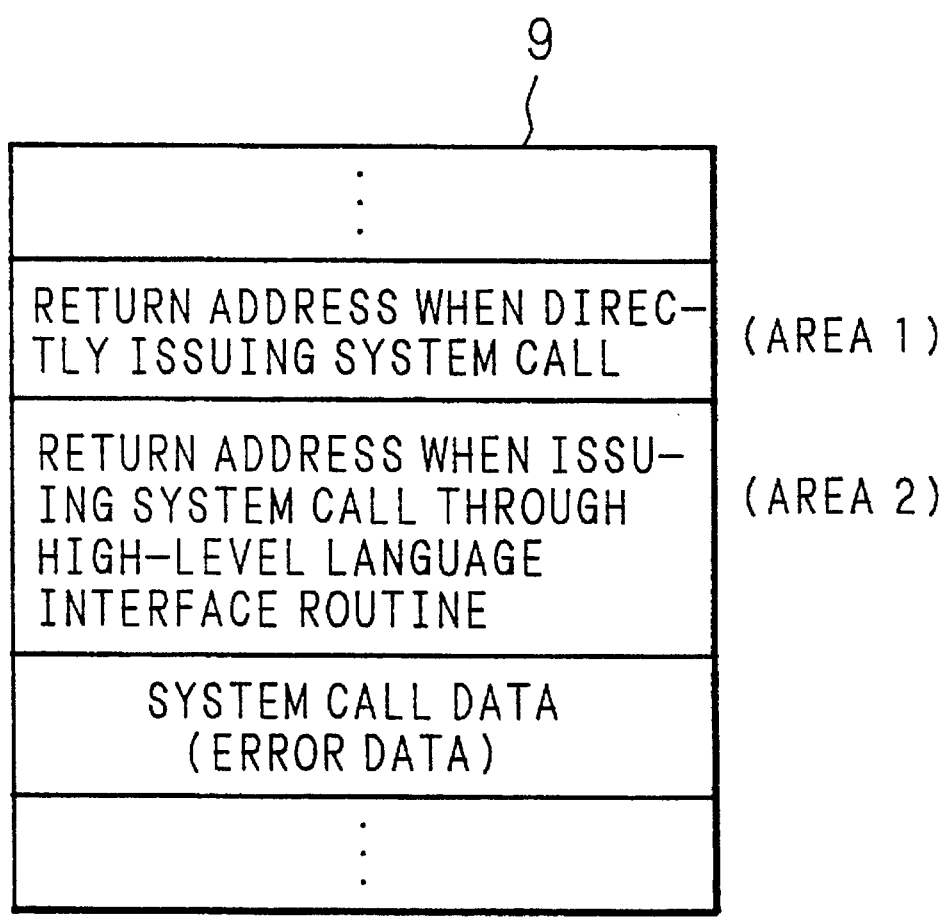
FIG. 22 is a conceptual diagram showing the kinds of data stored in an area 1 and area 2 in a table according to the second embodiment.

FIG. 21 is a flowchart illustrating the operation of the second embodiment when the system call is directly issued without passing the high-level language interface routine 12. The Following describes the case where the system call 1 having two parameters is issued from the assembly language application task A shown in FIG. 9. The function codes and the parameters are set into the respective registers (ST33). The system call is issued (ST34). As in the first embodiment, the contents of the stack after the system call has been issued are as shown in FIG. 11B. The return address (AD4) pushed onto the stack is fetched and stored into the table 9 in memory (area 1 in FIG. 22) (ST35). On the basis of the function codes of the system call, the number of parameters for the system call is obtained from the table shown in FIG. 13 (ST36). After incrementing the address by addresses proportional to the number of parameters, the contents (indefinite value) of the address is stored into the table 9 in memory (area 2 in FIG. 22) (ST37). As in the first embodiment, system call data is fetched and added to the table 9 in memory, control is passed to the supervisor 71 (ST38), and the supervisor 71 interprets the system call instruction (ST39). The system call data, i.e. the system call parameters and the system call issuing task name, is fetched and stored into table 9 (ST40). The supervisor 71 passes control to the memory management routine 72, the data management routine 73, process management routine 74, and the input/output management routine 75, to execute a process accompanied with the interrupt (ST41). When the processing of the system call is complete, control returns to the application task A.

FIG. 23A shows the contents of the table 9 in memory after the system call has been issued through the high-level language interface routine 12. FIG. 23B shows the contents of the table 9 in memory after the system call has been issued directly. As shown, in the table 9 of this embodiment, when the system call is issued directly, the return address to the application task is stored in the area 1, and when it is issued through the high-level language interface routine 12, the return address of the application task is stored in the area 2. In FIG. 23, addresses AD1 through AD5 are the same addresses as shown in FIG. 9.

When an error occurs during the execution of the system call, the error data (the address at which the error occurs, the task name that causes the error, etc.) that is able to fetch at the time of the error occurrence is fetched and stored into the table 9 in memory, as in the first embodiment. Also, the processing at the time of an interrupt occurrence is the same as that described in the first embodiment.

Figure 25:
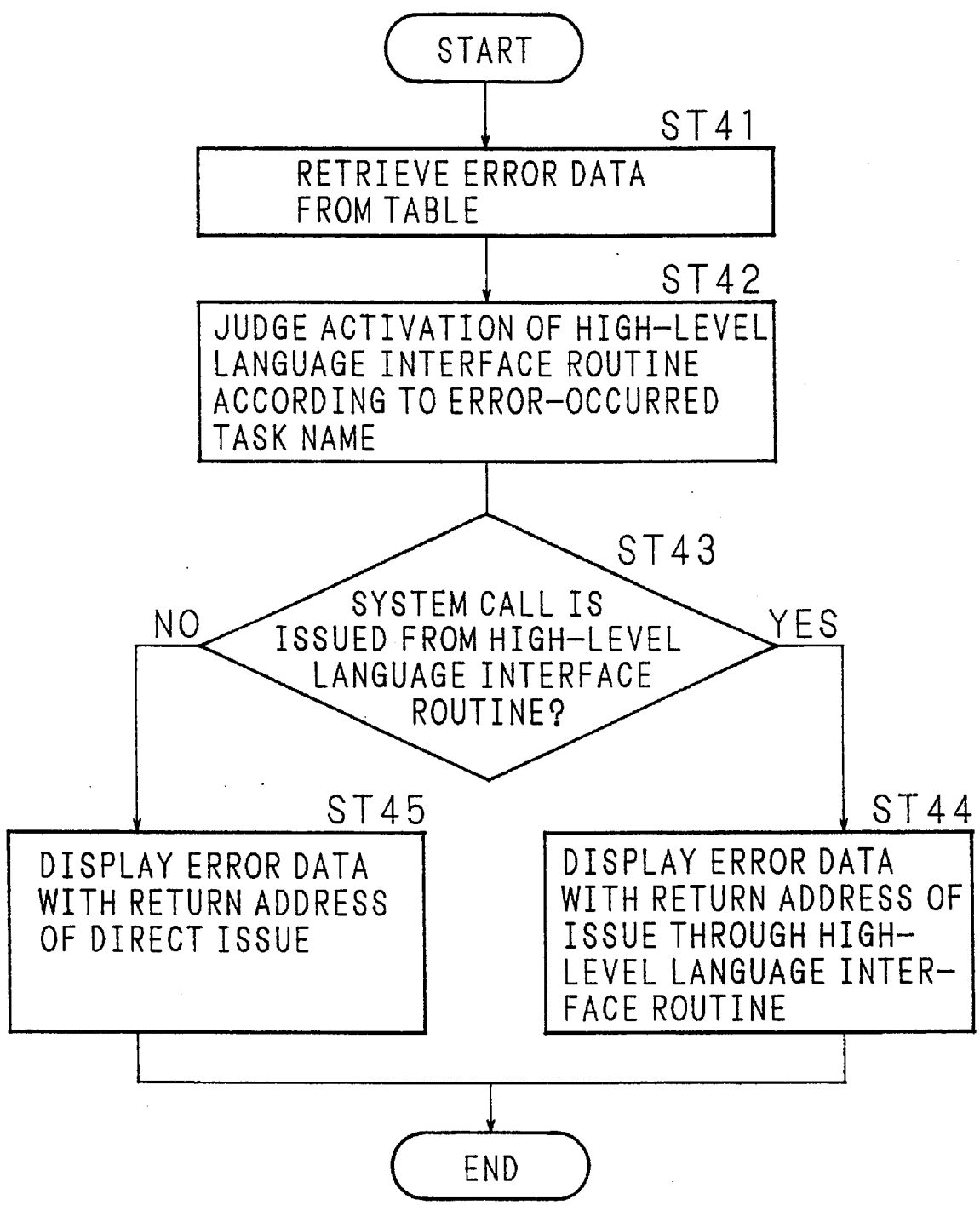
FIG. 25 is a flowchart illustrating a procedure for displaying the system call data.

We will now describe a method of system call data display with reference to the conceptual diagram of a table shown in FIG. 24 and the flowchart shown in FIG. 25.

To obtain error data, the user enters a command "show error", for example, in response to which the system call data display means 11 retrieves the error data from the table 9 (ST41). From the error causing task name contained in the error data, it is judged, by referencing the table of FIG. 24, whether the high-level language interface routine 12 is activated (ST42). If it is judged that the high-level language interface routine 12 is activated, error data such as the error causing task name and error causing address is displayed on the basis of the return address (return address AD1, AD2, or AD3 in FIG. 23A) stored in the area 2 of the table 9 in memory (FIG. 22) (ST44). If it is judged that the system call has been issued without activating the high-level language interface routine 12, error data is displayed on the basis of the return address (return address AD4 in FIG. 23B) stored in the area 1 of the table 9 in memory (FIG. 22) (ST45). When it is desired to know the system call issuing situation of the application task, the user enters a command "shown application name", for example. Using the above-described method, the system call data display means 11 displays the type of the issued system call, the parameters of the system call, the address in the application task from which the system call was issued, etc.

Figure 26:
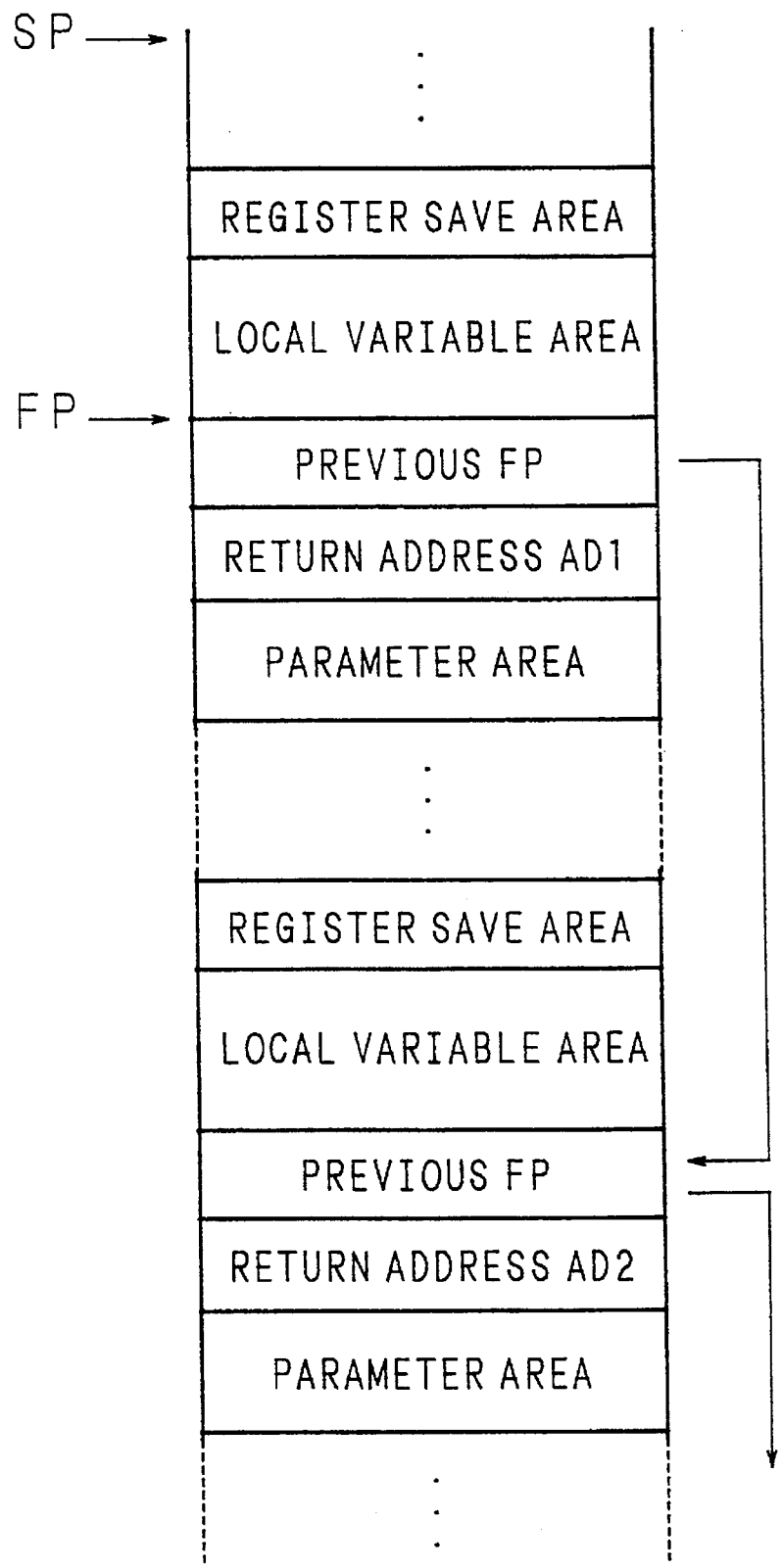
FIG. 26 is a conceptual diagram of a stack frame of nested functions.
Figure 27:
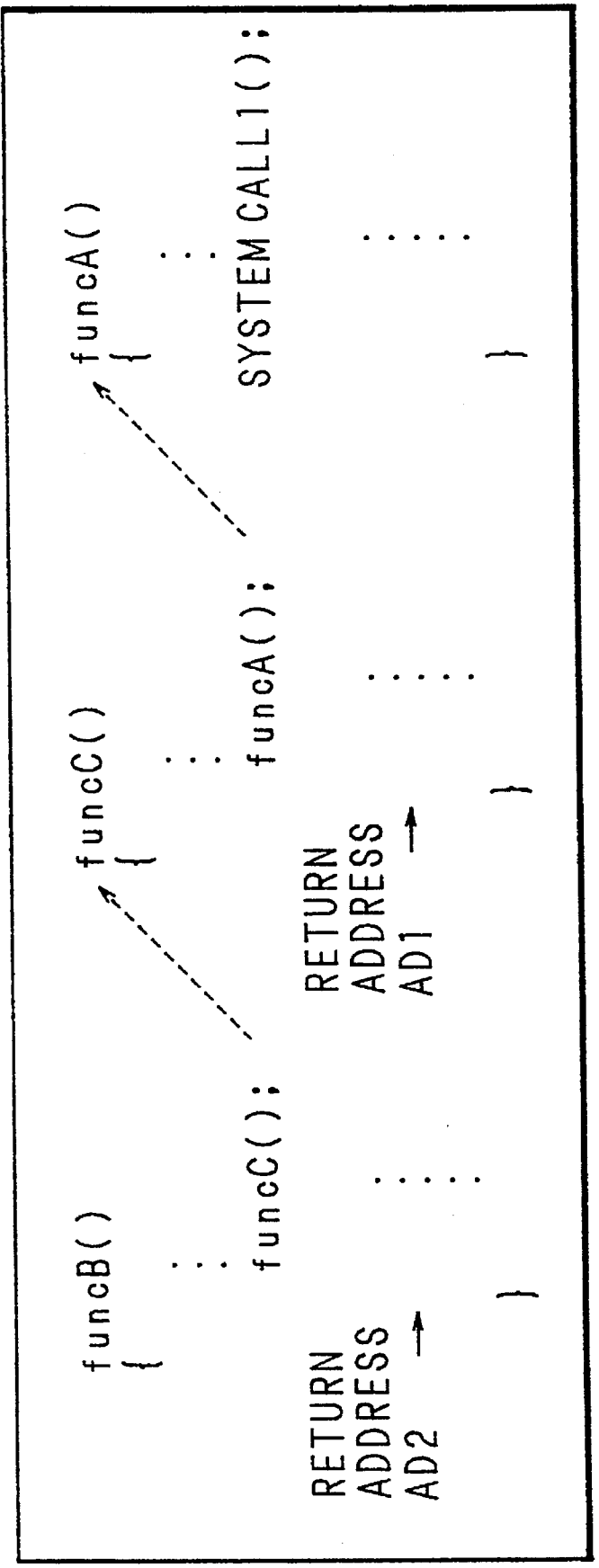
FIG. 27 is a diagram showing an example of a nested application task.

The first and second embodiments provide system call data that includes the return address to the application task. However, in an application task written in a high-level language, with functions (funcB(), funcC(), funcA()) nested as shown in FIG. 27, a stack frame such as shown in FIG. 26 is formed when the system call 1 is issued from the function funcA() called from another function funcC(). Therefore, it can be found that the system call 1 is issued after calling funcB(), funcC(), and funcA() by tracing the frame pointer (FP). As for the application task with such construction, the previous FPs for tracing the called functions may be fetched as system call data in the first and second embodiments.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An apparatus for aiding debugging an application task by fetching system call data concerning a system call which includes a return address to a calling task that is pushed onto a stack each time calling another task, when the system call is issued to an operating system from an application task written in an assembly language or from an application task written in a high-level language, said apparatus comprising:

a high-level language interface routine which is called when an application task written in a high level language is to be executed, and which converts the application task written in the high-level language into codes that can be executed;

means for determining whether the application task calls to pass the high-level language interface routine when the system call being issued;

a first table for storing the system call data;

a second table for storing the type of the system call with the number of parameters included in said system call;

means for extracting the number of parameters corresponding to the type of the issued system call by referencing the second table when the system call is issued from the application task written in the high-level language;

means for fetching the return address to the application task, which was pushed down the stack by addresses corresponding to the extracted number of parameters, when control is passed to the operating system resulting from the issue of the system call, and for storing the fetched return address into the first table;

means for giving an instruction to display the system call data; and means responsive to the instruction for displaying the system call data applied from the first table.

2. The apparatus as set forth in claim 1, wherein said determining means includes means for setting a flag when the high-level language interface routine is passed, and means for checking whether said flag is set or not.

3. The apparatus as set forth in claim 1, wherein said determining means includes a third table for storing the return address to the high-level language interface routine, and means for determining whether the third table contains the return address to the high-level language interface routine saved on the stack when the system call is issued from the high-level language interface routine.

4. An apparatus for aiding debugging an application task by fetching system call data concerning a system call which includes a return address to the calling task that is pushed onto a stack each time calling another task, when the system call is issued to an operating system from an application task written in an assembly language or from an application task written in a high-level language, said apparatus comprising:

a high-level language interface routine which is called when an application task written in a high level language is to be executed, and which converts the application task written in the high-level language into codes that can be executed;

a first table for storing the system call data;

a second table for storing the type of a system call with the number of parameters included in the system call;

means for extracting the number of parameters corresponding to the type of the issued system call by referencing the second table when the system call is issued;

means for fetching the return address to the immediately previous task pushed onto the stack, when control is passed to the operating system resulting from the issue of the system call, as first data, and for fetching data pushed down the stack by addresses corresponding to the extracted number of parameters as second data, and for storing the fetched data into the first table;

means for determining whether the application task that issued the system call passes the high-level language interface routine;

means for giving an instruction to display the system call data; and means responsive to the means for determining and means for giving an instruction for displaying the first data when said application task does not pass the high-level language interface routine, or the second data when said application task passes the high-level language interface routine, said first and second data being displayed as the return address to the application task that issued the system call.

5. The apparatus as set forth in claim 4, wherein said determining means includes a third table for storing data indicating whether each individual application task is a task that passes the high-level language interface routine.

* * * * *